(12) United States Patent
Miyanaga et al.

(10) Patent No.: US 8,050,620 B2
(45) Date of Patent: Nov. 1, 2011

(54) WIRELESS STATION, WIRELESS TRANSMISSION METHOD FOR THE WIRELESS STATION, AND WIRELESS TRANSMISSION SYSTEM USING THE WIRELESS STATION

(75) Inventors: Kenji Miyanaga, Osaka (JP); Hitoshi Takai, Osaka (JP); Hideki Nakahara, Hyogo (JP); Hidetoshi Yamasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 678 days.

(21) Appl. No.: 12/162,013

(22) PCT Filed: Jan. 31, 2007

(86) PCT No.: PCT/JP2007/051628
§ 371 (c)(1),
(2), (4) Date: Jul. 24, 2008

(87) PCT Pub. No.: WO2007/088906
PCT Pub. Date: Aug. 9, 2007

(65) Prior Publication Data
US 2009/0036052 A1 Feb. 5, 2009

(30) Foreign Application Priority Data
Feb. 1, 2006 (JP) .............. 2006-024628

(51) Int. Cl.
*H04B 3/36* (2006.01)
*H04B 7/15* (2006.01)
*H04B 7/14* (2006.01)

(52) U.S. Cl. .............. 455/11.1; 455/7; 455/16; 455/15

(58) Field of Classification Search .......... 455/7, 9, 455/16, 11.1
See application file for complete search history.

(56) References Cited

U.S. PATENT DOCUMENTS

| 5,678,177 | A  | * | 10/1997 | Beasley | 455/16 |
| 5,987,011 | A  | * | 11/1999 | Toh | 370/331 |
| 7,359,673 | B2 | * | 4/2008 | Nakagawa | 455/11.1 |
| 7,684,337 | B2 | * | 3/2010 | Mehta et al. | 370/238 |
| 7,962,092 | B2 | * | 6/2011 | Kho et al. | 455/11.1 |

(Continued)

FOREIGN PATENT DOCUMENTS

JP 11-298384 10/1999

(Continued)

OTHER PUBLICATIONS

International Search Report mailed May 15, 2007 for International Application No. PCT/JP2007/051628.

(Continued)

*Primary Examiner* — Tilahun B Gesesse
(74) *Attorney, Agent, or Firm* — Wenderoth, Lind & Ponack, L.L.P.

(57) ABSTRACT

A wireless station is used as one of a plurality of relay stations forming transmission paths, respectively, different from each other, in a wireless transmission system for transmitting a packet from a transmitting station to a receiving station through the plurality of relay stations. The wireless station includes a reception section for receiving a packet transmitted from the transmitting station, and receiving a packet which is transmitted, based on the packet transmitted from the transmitting station, from another relay station, and is transmitted before the one of the plurality of relay stations performs transmission, by using a transmission parameter for obtaining a path diversity effect in the wireless transmission system.

16 Claims, 20 Drawing Sheets

U.S. PATENT DOCUMENTS

2004/0266339 A1* 12/2004 Larsson ............................. 455/7

FOREIGN PATENT DOCUMENTS

JP 2000-115181 4/2000

OTHER PUBLICATIONS

H. Takai, "BER Performance of Anti-Multipath Modulation Scheme PSK-VP and its Optimum Phase-Waveform", (IEEE, Trans. Veh. Technol.) vol. VT-42, No. 4, Nov. 1993, pp. 625-640.

S. Ariyavisitakul, S. Yoshida, F. Ikegami, K. Tanaka, T. Takeuchi, "A Power-efficient linear digital modulator and its application to an anti-multipath modulation PSK-RZ scheme", (Proceedings of IEEE Vehicular Technology Conference 1987), Jun. 1987, pp. 66-71.

S. Ariyavisitakul, S. Yoshida, F. Ikegami, T. Takeuchi, "A Novel Anti-Multipath Modulation Technique DSK", (IEEE Trans. Communication), vol. COM-35, No. 12, Dec. 1987, pp. 1252-1264.

Ayako Iwata et al., "Jushin Hinshitsu ni Ojite Chukeikyoku o Sentaku suru Multihop System", IEICE Technical Report, vol. 105, No. 36, The Institute of Electronics, Information and Communication Engineers, Oct. 20, 2005, pp. 121 to 126.

Stefanov, A. et al., "Cooperative space-time coding for MIMO OFDM systems", Military Communications Conference, 2005, MILCOM 2005, IEEE, vol. 2, Oct. 17, 2005, pp. 990-995.

Miyano, T. et al., "Cooperative relaying scheme with space time code for multihop communications among single antenna terminals", Global Telecommunications Conference, 2004. GLOBECOM '04. IEEE, vol. 6, Dec. 2004, pp. 3763-3767.

* cited by examiner

FIG. 10

| PR LENGTH SELECTION PATTERN | (a) PROBABILITY WITH WHICH EACH PR LENGTH SELECTION PATTERN IS SELECTED | (b) PROBABILITY OF 1 BRANCH | (c) PROBABILITY OF 2 BRANCHES | (d) PROBABILITY OF 3 BRANCHES | (e) PROBABILITY OF 4 BRANCHES |
|---|---|---|---|---|---|
| (1) FOUR STATIONS SELECT THE SAME PR LENGTH | 1/64 | 1/64 | 21/64 | 9/16 | 3/32 |
| (2) THREE STATIONS SELECT LONG PR, AND ONE STATION SELECTS SHORT PR | 3/32 | 0 | 1/16 | 9/16 | 3/8 |
| (3) TWO STATIONS SELECT LONG PR, AND TWO STATIONS SELECT SHORT PR | 9/64 | 0 | 1/12 | 13/24 | 3/8 |
| (4) ONE STATION SELECTS LONG PR, AND THREE STATIONS SELECT SHORT PR | 3/32 | 0 | 1/9 | 2/3 | 2/9 |
| (5) TWO STATIONS SELECT LONG PR, ONE STATION SELECTS MEDIUM PR, AND ONE STATION SELECTS SHORT PR | 3/16 | 0 | 0 | 1/4 | 3/4 |
| (6) ONE STATION SELECTS LONG PR, TWO STATIONS SELECT MEDIUM PR, AND ONE STATION SELECTS SHORT PR | 3/16 | 0 | 0 | 1/3 | 2/3 |
| (7) ONE STATION SELECTS LONG PR, ONE STATION SELECTS MEDIUM PR, AND TWO STATIONS SELECT SHORT PR | 3/16 | 0 | 0 | 1/2 | 1/2 |
| (8) FOUR STATIONS SELECT PR LENGTHS, RESPECTIVELY, DIFFERENT FROM EACH OTHER | 3/32 | 0 | 0 | 0 | 1 |
| AVERAGE PROBABILITY |  | 1/4096 | 407/12288 | 413/1024 | 3461/6144 |

F I G. 1 8
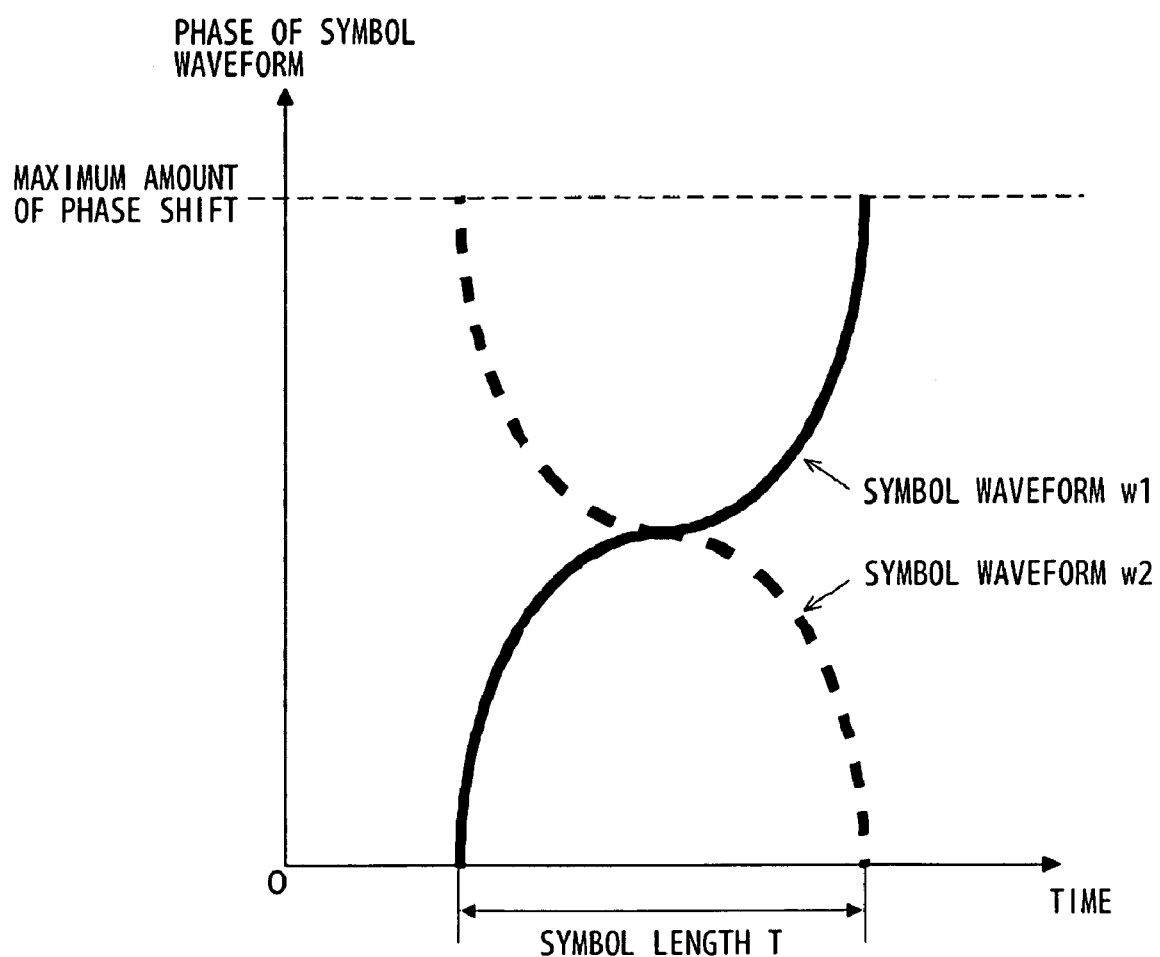

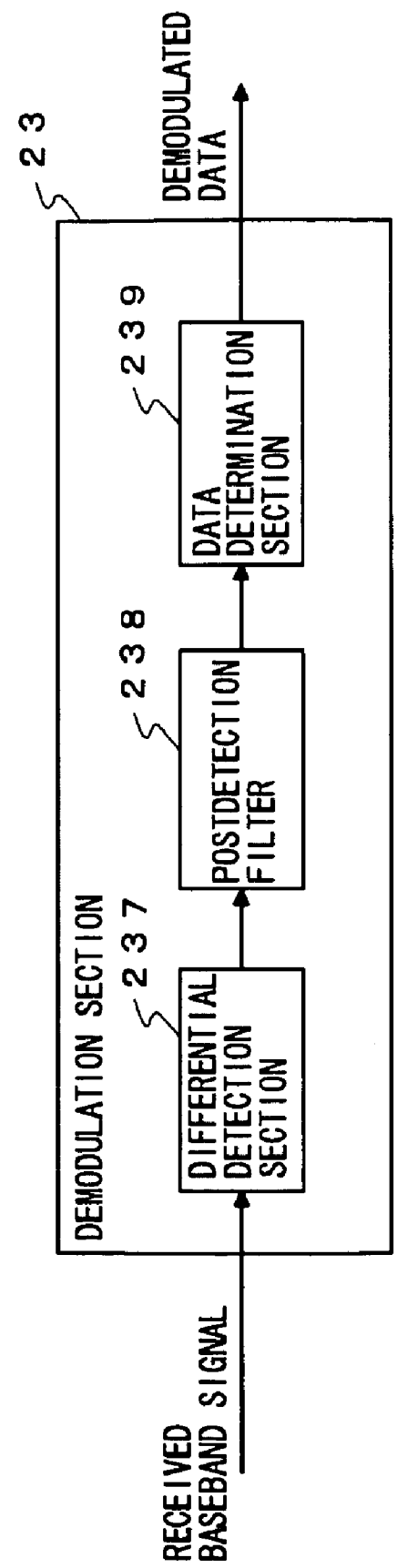

WIRELESS STATION, WIRELESS TRANSMISSION METHOD FOR THE WIRELESS STATION, AND WIRELESS TRANSMISSION SYSTEM USING THE WIRELESS STATION

TECHNICAL FIELD

The present invention relates to a wireless station, a wireless transmission method for the wireless station, and a wireless transmission system using the wireless station, and more particularly to a wireless station for transmitting a packet using a modulation/demodulation scheme with an anti-multipath property, a wireless transmission method for the wireless station, and a wireless transmission system using the wireless station.

BACKGROUND ART

In general, in wireless communication, a radio wave transmitted from a transmitting station arrives at a receiving station through a plurality of transmission paths (multipath) and therefore a state occurs where the receiving station receives a plurality of path wavelets at various times. In this state, multipath fading occurs at the receiving station. Therefore, in a conventional wireless communication, a modulation/demodulation scheme with an anti-multipath property is used so as to prevent the multipath fading from deteriorating transmission characteristic.

As the modulation/demodulation scheme with an anti-multipath property, for example, a spread spectrum scheme, orthogonal frequency division multiplexing (OFDM) scheme, anti-multipath modulation scheme, and the like are used. The orthogonal frequency division multiplexing scheme is a scheme in which a packet is divided so as to be transmitted by using multiple subcarriers located over a wide band. The anti-multipath modulation scheme is a scheme in which anti-multipath property is represented by adding a phase redundancy and/or an amplitude redundancy in a transmission symbol. Even when wireless communication is performed by using a typical single carrier modulation scheme, the anti-multipath property is represented by using an equalizer in the receiving station.

Further, the spread spectrum scheme includes direct sequence spread spectrum (DSSS) scheme, frequency hopping spread spectrum (FHSS) scheme, time hopping spread spectrum (THSS) scheme, and the like. The direct sequence spread spectrum scheme is a scheme in which a spread code of a band wider than that of an unspread packet is multiplied by a packet so as to transmit the packet. The frequency hopping spread spectrum scheme is a scheme in which a transmission frequency for a packet is caused to hop over a wide band so as to transmit the packet. The time hopping spread spectrum scheme is a scheme in which a packet is spread by using an impulse signal of a wide band, and transmitted.

Further, the anti-multipath modulation scheme includes a PSK-VP (Phase Shift Keying with Varied Phase) scheme in which a convex phase redundancy is added (for example, Non-Patent Document 1), a PSK-RZ (Return to Zero Phase Shift Keying) scheme in which an amplitude redundancy is added (for example, Non-Patent Document 2), a DSK (Double Shift Keying) scheme (for example, Non-Patent Document 3), and the like. The single carrier modulation scheme includes, for example, a PSK (Phase Shift Keying) scheme, a QAM (Quadrature Amplitude Modulation) scheme, and the like.

Communication is performed by using such a modulation/demodulation scheme with an anti-multipath property so as to prevent deterioration of transmission characteristic caused by the multipath fading.

Further, in recent years, a study for a wireless transmission system (multihop system) for performing a wireless transmission by a plurality of wireless stations relaying packets from each other is proceeding. Conventionally, a technique using a modulation/demodulation scheme with an anti-multipath property has been suggested in this study (for example, Patent Document 1). Hereinafter, a conventional wireless transmission system 9 will be described with reference to FIG. 20. FIG. 20 is a diagram illustrating a configuration of the conventional wireless transmission system 9. In FIG. 20, the wireless transmission system 9 includes a transmitting station 91, relay stations 921 to 924, and a receiving station 93. The transmitting station 91 is a wireless station for initially transmitting a packet. The relay stations 921 to 924 are each a wireless station for relaying, to the receiving station 93, a packet transmitted by the transmitting station 91. The receiving station 93 is a wireless station which is a final destination to which the transmitting station 91 transmits a packet. Each wireless station uses the OFDM scheme as the modulation/demodulation scheme with an anti-multipath property. A packet is transmitted from the transmitting station 91 as indicated by dotted line arrows. The packet transmitted from the transmitting station 91 is received by each of the relay stations 921 to 924. The relay stations 921 to 924 simultaneously transmit the received packets, as indicated by solid linear rows. The packets transmitted by there lay stations 921 to 924 are received by the receiving station 93. Thus, the conventional wireless transmission system 9 causes the relay stations 921 to 924 to simultaneously transmit the packets, thereby reducing a time necessary for packet transmission. Each wireless station used for the conventional wireless transmission system 9 uses the OFDM scheme as the modulation/demodulation scheme with an anti-multipath property. Therefore, even when the packets which are simultaneously transmitted from the relay stations 921 to 924, respectively, arrive at the receiving station 93 at various arrival times, it is possible to prevent deterioration of transmission characteristic caused by the multipath fading.

Patent Document 1: Japanese Laid-Open Patent Publication No. 2000-115181
Non-Patent Document 1: H. Takai, "BER Performance of Anti-Multipath Modulation Scheme PSK-VP and its Optimum Phase-Waveform", (IEEE, Trans. Veh. Technol.), Vol. VT-42, November, 1993, p 625-639
Non-Patent Document 2: S. Ariyavisitakul, S. Yoshida, F. Ikegami, K. Tanaka, T. Takeuchi, "A Power-efficient linear digital modulator and its application to an anti-multipath modulation PSK-RZ scheme", (Proceedings of IEEE Vehicular Technology Conference 1987), June, 1987, p 66-71
Non-Patent Document 3: S. Ariyavisitakul, S. Yoshida, F. Ikegami, T. Takeuchi, "A Novel Anti-Multipath Modulation Technique DSK", (IEEE Trans. Communication), Vol. COM-35, No. 12, December, 1987, p 1252-1264

SUMMARY OF THE INVENTION

Problems to be Solved by the Invention

When differences (herein after, referred to as an arrival time difference) among times at which a plurality of path wavelets of the multipath arrive at the receiving station, are appropriate, diversity reception is performed at the receiving station. The diversity reception enhances improvement of transmission characteristic. Hereinafter, an effect obtained by the diversity reception is referred to as a path diversity effect. When, for example, the OFDM scheme is used as the modulation/demodulation scheme with an anti-multipath property, the path wavelet component is absorbed in a guard interval set in a packet, and therefore the upper limit of the arrival time difference represents a guard interval length. On the other hand, the lower limit of the arrival time difference represents a time corresponding to about an inverse of a frequency bandwidth including a plurality of subcarriers.

However, the conventional wireless transmission system 9 is a technique suggested only for improving an efficiency for transmitting a packet, and achievement of the path diversity effect is not taken into consideration. Therefore, there is a problem that no path diversity effect is obtained, depending on a setting state where wireless stations are set. Hereinafter, the setting state in which no path diversity effect is obtained will be described.

As the setting state in which no path diversity effect is obtained, assumed is a state where the relay stations 921 to 924 are set at positions, respectively, which are almost the same distance away from the receiving station 93. In this setting state, even when the arrival times of the packets which are simultaneously transmitted from the relay stations 921 to 924, respectively, are different from each other, the arrival time differences among the respective packets may be, in some case, shorter than a time corresponding to about the inverse of a frequency bandwidth including a plurality of subcarriers. Specifically, in some case, the arrival time differences among the respective packets may be smaller than the lower limit of the arrival time difference which enables achievement of the path diversity effect. In this case, the path diversity effect cannot be obtained.

Further, in the state where the relay stations 921 to 924 are set at positions, respectively, which are almost the same distance away from the receiving station 93, even when the packets transmitted by the relay stations 921 to 924, respectively, are simultaneously received by the receiving station 93, some of the packets may be in opposite phase to each other in some case. As this case, for example, a case where a packet transmitted from the relay station 921 and a packet transmitted from the relay station 922 are simultaneously received, by the receiving station 93, so as to be in opposite phase to each other, and a case where a packet transmitted from the relay station 923 and a packet transmitted from the relay station 924 are simultaneously received, by the receiving station 93, so as to be in opposite phase to each other, may be assumed. In this case, the arrival time differences between the respective packets represent zero, and therefore, although deterioration of transmission characteristic is not caused by the multipath fading, the path diversity effect is not obtained. Further, the packet transmitted from the relay station 921 and the packet transmitted from the relay station 922 cancel each other, and the packet transmitted from the relay station 923 and the packet transmitted from the relay station 924 cancel each other, and therefore the receiving station 93 is not allowed to accurately demodulate the packet.

Thus, the conventional wireless transmission system 9 has a problem that no path diversity effect is obtained, depending on a state where the wireless stations are set, and has another problem that the receiving station 93 is not able to accurately demodulate a packet.

Therefore, an object or the present invention is to provide a wireless station, for use in a wireless transmission system, enabling achievement of a path diversity effect regardless of a setting state thereof, a wireless transmission method for the wireless station, and the wireless transmission system using the wireless station.

Solution to the Problems

The present invention is directed to a wireless station, and, in order to solve the aforementioned problems, the wireless station according to the present invention is a wireless station used as one of a plurality of relay stations forming transmission paths, respectively, different from each other, in a wireless transmission system for transmitting a packet from a transmitting station to a receiving station through the plurality of relay stations, and the wireless station comprises: a reception section for receiving a packet transmitted from the transmitting station, and receiving a packet which is transmitted, based on the packet transmitted from the transmitting station, from a relay station other than the one of the plurality of relay stations, and is transmitted before the one of the plurality of relay stations performs transmission, by using a transmission parameter for obtaining a path diversity effect in the wireless transmission system; a transmission parameter estimation section for estimating the transmission parameter used by the relay station other than the one of the plurality of relay station, based on the packet received by the reception section from the relay station other than the one of the plurality of relay stations; a transmission parameter selection section for selecting the transmission parameter other than the transmission parameter which is used by the relay station other than the one of the plurality of relay stations, the transmission parameter which is used by the relay station other than the one of the plurality of relay stations being estimated by the transmission parameter estimation section; and a transmission section for transmitting, to the receiving station, the packet received by the reception section from the transmitting station, by using the transmission parameter selected by the transmission parameter selection section.

The transmission parameter estimation section corresponds to a symbol waveform/delay amount estimation section 28 of embodiments, and the transmission parameter selection section corresponds to a symbol waveform/delay amount selection section 29 of the embodiments. Further, the transmission section corresponds to a transmission packet processing section 27, a transmission timing control section 30, a modulation section 31, an RF section 22, and an antenna 21 of the embodiments. Further, the reception section corresponds to a demodulation section 23, the RF section 22, and the antenna 21 of the embodiments.

According to the present invention, the transmission parameter selection section selects the transmission parameter other than the transmission parameter used by a relay station other than the self relay station, and the transmission section transmits a packet received from the transmitting station by using the selected transmission parameter. Therefore, the path diversity effect can be obtained in the wireless transmission system. Thus, according to the present invention, the relay station uses the transmission parameter other than the transmission parameter used by a non-self relay station to transmit a packet, and therefore, the path diversity effect can be obtained even when the respective relay stations are set so as to be almost the same distance away from the receiving station. That is, according to the present invention, the path diversity effect can be obtained regardless of the setting state.

More preferably, the transmission parameter selection section has previously stored therein a plurality of the transmission parameters different from each other, and the transmission parameter selection section may select the transmission parameter other than the transmission parameter which is used by the relay station other than the one of the plurality of relay stations and is estimated by the transmission parameter estimation section, from among the plurality of the transmission parameters previously stored therein.

More preferably, the reception section receives packets transmitted from a plurality of the relay stations other than the one of the plurality of relay stations, and the transmission parameter estimation section estimates a plurality of the transmission parameters used by the plurality of the relay stations, respectively, other than the one of the plurality of relay stations, based on the packets transmitted from the plurality of the relay stations, respectively, other than the one of the plurality of relay stations, and the transmission parameter selection section has previously stored therein a plurality of the transmission parameters different from each other, and the transmission parameter selection section stops, when each of the plurality of the transmission parameters previously stored therein corresponds to any of the plurality of the transmission parameters estimated by the transmission parameter estimation section, a process of selecting the transmission parameter, and the transmission section performs no transmission to the receiving station when the transmission parameter selection section stops the process of selecting the transmission parameter. Therefore, it is possible to prevent unnecessary transmission of a packet to the receiving station, and power consumption can be reduced in the wireless transmission system.

More preferably, a head portion of the packet includes a preamble, and the wireless station further comprises a preamble selection section, having previously stored therein a plurality of types of preamble length information representing lengths, respectively, of the preamble, the lengths being different from each other, for selecting one of the plurality of types of preamble length information at random, and the transmission section may transmit the packet received from the transmitting station, at a timing based on a length represented by the one of the plurality of types of preamble length information, which is selected by the preamble selection section. Therefore, timings at which a plurality of relay stations, respectively, perform transmissions may be different from each other in some case, and therefore the relay station is allowed to estimate the transmission parameter used by a non-self relay station, based on a packet transmitted by the non-self relay station before the self relay station performs the transmission.

Further, the lengths represented by the plurality of types of preamble length information, respectively, may be each a length within a predetermined range. Therefore, it is unnecessary to transmit a packet including an unnecessarily redundant preamble. Furthermore, a number of the types of preamble length information may be equal to or greater than a number of types of the transmission parameter. Thus, it is possible to enhance improvement of the path diversity effect.

Further, more preferably, a head portion of the packet includes a preamble, and the wireless station may further comprise a preamble selection section, having previously stored therein a plurality of data sequences of the preamble, the plurality of data sequences being different from each other, for selecting one of the plurality of data sequences, and the transmission section may replace the preamble included in the packet received from the transmitting station, with a preamble having the one of the plurality of data sequences, which is selected by the preamble selection section, and transmits, to the receiving station, the packet which is received from the transmitting station and has the preamble replaced, by using the transmission parameter selected by the transmission parameter selection section. Therefore, it is possible to enhance improvement of the path diversity effect.

Further, more preferably, the transmission parameter may represent at least one of a delay amount for delaying a timing at which the packet transmitted from the transmission section is to be received by the receiving station, and a symbol waveform used by the transmission section for modulating the packet received from the transmitting station.

Further, more preferably, the transmission parameter estimation section may estimate the transmission parameter used by the relay station other than the one of the plurality of relay stations, by obtaining a correlation between a predetermined waveform and a waveform represented by the packet received by the reception section from the relay station other than the one of the plurality of relay stations. The correlation between waveforms enables accurate estimation of the transmission parameter of each of the plurality of packets received by the reception section in a state where the plurality of packets are superimposed on each other.

Further, more preferably, the transmission parameter may represent a symbol waveform used by the transmission section for modulating the packet received from the transmitting station, and the transmission parameter estimation section may generate a correlation signal representing a result of the correlation between the predetermined waveform and the waveform represented by the packet received by the reception section from the relay station other than the one of the plurality of relay stations, and estimate, when the correlation signal represents a peak having a value greater than or equal to a predetermined threshold value, that the symbol waveform used by the relay station other than the one of the plurality of relay stations is based on the predetermined waveform.

Further, more preferably, the transmission parameter may represent a delay amount for delaying a timing at which the packet transmitted from the transmission section is to be received by the receiving station, and the transmission parameter estimation section may generate a correlation signal representing a result of the correlation between the predetermined waveform and the waveform represented by the packet received by the reception section from the relay station other than the one of the plurality of relay stations, and estimate the delay amount used by the relay station other than the one of the plurality of relay stations, based on a timing at which a peak having a value greater than or equal to a predetermined threshold value appears in the correlation signal.

Further, more preferably, the transmission parameter may represent a delay amount for delaying a timing at which the packet transmitted from the transmission section is to be received by the receiving station, and a symbol waveform used by the transmission section for modulating the packet received from the transmitting station, and the transmission parameter estimation section may generate a correlation signal representing a result of the correlation between the predetermined waveform and the waveform represented by the packet received by the reception section from the relay station other than the one of the plurality of relay stations, and estimate, when the correlation signal represents a peak having a value greater than or equal to a predetermined threshold value, that the symbol waveform used by the relay station other than the one of the plurality of relay stations is based on the predetermined waveform, and estimate the delay amount used by the relay station other than the one of the plurality of relay stations, based on a timing at which the peak appears.

Further, the present invention is also directed to a wireless transmission system, and, in order to solve the aforementioned problems, the wireless transmission system according to the present invention is a wireless transmission system for transmitting a packet from a transmitting station to a receiving station through a plurality of relay stations forming transmission paths, respectively, different from each other, and the wireless transmission system comprises: the transmitting station for transmitting the packet; the plurality of relay stations, forming the transmission paths, respectively, different from each other, for relaying, to the receiving station, the packet received from the transmitting station; and the receiving station for receiving the packet transmitted from each of the plurality of relay stations, and each of the plurality of relay stations includes: a primary reception section for receiving the packet transmitted from the transmitting station, and receiving a packet which is transmitted, based on the packet transmitted from the transmitting station, from a relay station other than a self relay station, and is transmitted before the self relay station performs transmission, by using a transmission parameter for obtaining a path diversity effect in the wireless transmission system; a primary transmission parameter estimation section for estimating the transmission parameter used by the relay station other than the self relay station, based on the packet received by the primary reception section from the relay station other than the self relay station; a primary transmission parameter selection section for selecting the transmission parameter other than the transmission parameter which is used by the relay station other than the self relay station, the transmission parameter which is used by the relay station other than the self relay station being estimated by the primary transmission parameter estimation section; and a primary transmission section for transmitting, to the receiving station, the packet received by the primary reception section from the transmitting station, by using the transmission parameter selected by the primary transmission parameter selection section.

More preferably, the transmitting station may include: a secondary reception section for receiving the packet which is transmitted, based on the packet transmitted from the transmitting station, from at least one of the plurality of relay stations, and is transmitted before the transmitting station performs transmission, by using the transmission parameter; a secondary transmission parameter estimation section for estimating the transmission parameter used by the at least one of the plurality of relay stations, based on the packet received from the at least one of the plurality of relay stations by the secondary reception section; a secondary transmission parameter selection section for selecting the transmission parameter other than the transmission parameter which is used by the at least one of the plurality of relay stations and is estimated by the secondary transmission parameter estimation section; and a secondary transmission section for transmitting, to the receiving station, a packet to be transmitted from the transmitting station, by using the transmission parameter selected by the secondary transmission parameter selection section.

Further, the primary transmission parameter selection section may have a plurality of the transmission parameters different from each other previously stored therein, and the primary transmission parameter selection section may select the transmission parameter other than the transmission parameter which is used by the relay station other than the self relay station, and is estimated by the primary transmission parameter estimation section, from among the plurality of the transmission parameters previously stored therein, and the secondary transmission parameter selection section may have previously stored therein a plurality of the transmission parameters, different from each other, other than the plurality of the transmission parameters previously stored in the primary transmission parameter selection section, and the secondary transmission parameter selection section may select the transmission parameter other than the transmission parameter which is used by the at least one of the plurality of relay stations and is estimated by the secondary transmission parameter estimation section, from among the plurality of the transmission parameters previously stored therein.

Further, more preferably, the primary transmission parameter selection section may have a plurality of the transmission parameters different from each other previously stored therein, and the primary transmission parameter selection section may select the transmission parameter other than the transmission parameter which is used by the relay station other than the self relay station, and is estimated by the primary transmission parameter estimation section, from among the plurality of the transmission parameters previously stored therein, and the transmitting station may have previously stored therein a predetermined transmission parameter other than the plurality of the transmission parameters previously stored in the primary transmission parameter selection section, and the transmitting station may transmit the packet to be used by the plurality of relay stations, and thereafter further transmits, to the receiving station, the packet to be transmitted from the transmitting station, by using the predetermined transmission parameter previously stored therein.

Further, the present invention is also directed to a wireless transmission method, and, in order to solve the aforementioned problems, the wireless transmission method according to the present invention is a wireless transmission method performed by a wireless station used as one of a plurality of relay stations forming transmission paths, respectively, different from each other, in a wireless transmission system for transmitting a packet from a transmitting station to a receiving station through the plurality of relay stations, and the wireless transmission method comprises: a reception step of receiving a packet transmitted from the transmitting station, and receiving a packet which is transmitted, based on the packet transmitted from the transmitting station, from a relay station other than the one of the plurality of relay stations, and is transmitted before the one of the plurality of relay stations performs transmission, by using a transmission parameter for obtaining a path diversity effect in the wireless transmission system; a transmission parameter estimation step of estimating the transmission parameter used by the relay station other than the one of the plurality of relay stations, based on the packet received from the relay station other than the one of the plurality of relay stations in the reception step; a transmission parameter selection step of selecting the transmission parameter other than the transmission parameter which is used by the relay station other than the one of the plurality of relay stations, the transmission parameter which is used by the relay station other than the one of the plurality of relay stations being estimated in the transmission parameter estimation step; and a transmission step of transmitting, to the receiving station, the packet received from the transmitting station in the reception step, by using the transmission parameter selected in the transmission parameter selection step.

EFFECT OF THE INVENTION

According to the present invention, it is possible to provide a wireless station enabling achievement of the path diversity effect regardless of a setting state thereof, a wireless transmission method for the wireless station, and a wireless transmission system using the wireless station.

BRIEF DESCRIPTION OF THE DRAWINGS

FIG. 10 is a diagram illustrating a result of a calculation of a probability with which a path diversity effect is obtained.

FIG. 18 is a diagram illustrating exemplary phase shifts of symbol waveforms obtained when the system (F) is applied.

FIG. 19 is a block diagram illustrating a configuration of the demodulation section 23 used when a path diversity system of (F) is used.

Figure 1:
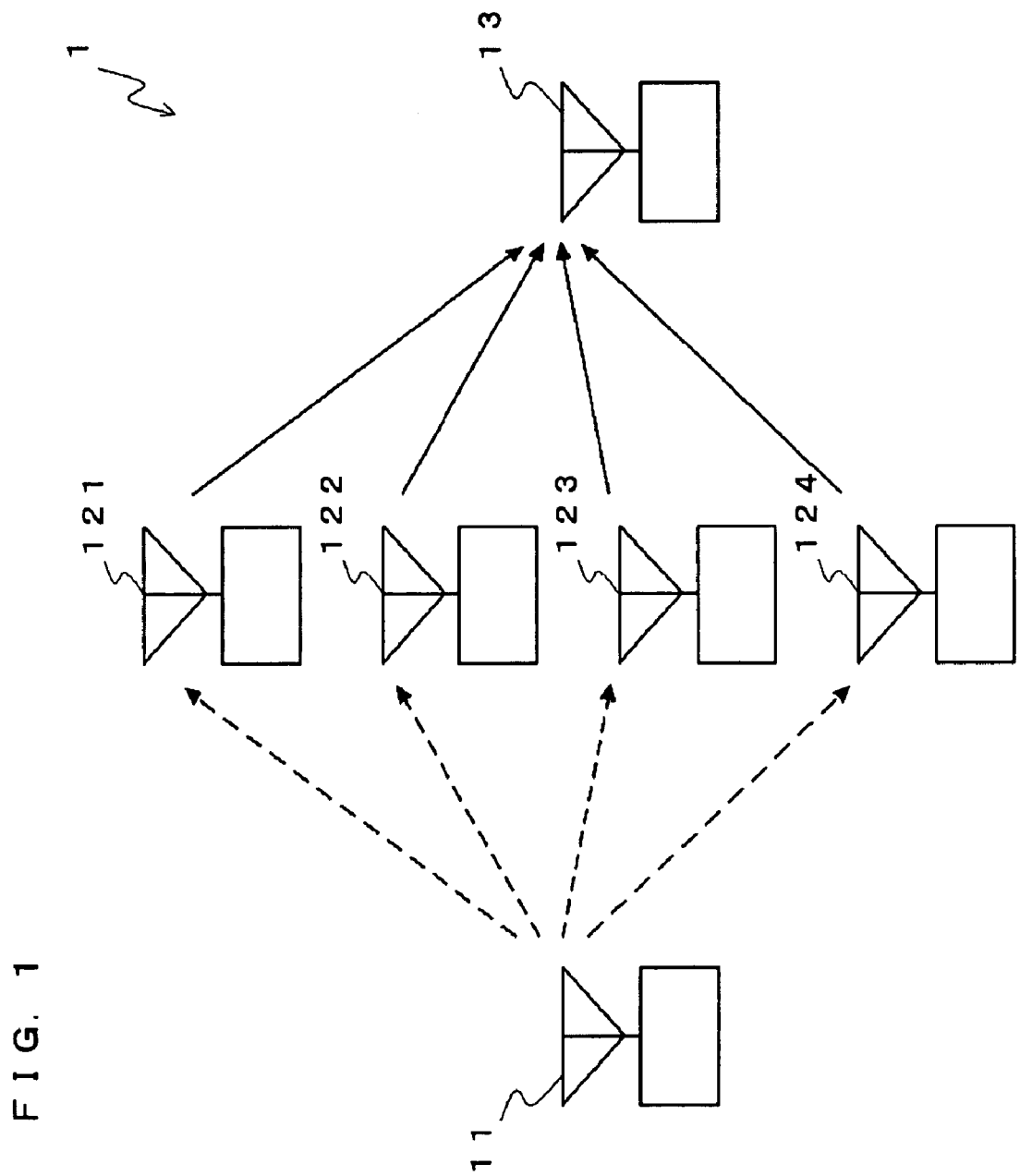
FIG. 1 is a diagram illustrating a configuration of a wireless transmission system 1 according to a first embodiment.

DESCRIPTION OF THE REFERENCE CHARACTERS 11, 11a transmitting station
121, 122, 123, 124 relay station
13 receiving station
23 demodulation section
24 self-destined packet determination section
25 self-destined packet processing section
26 preamble selection section
27 transmission packet processing section
28 symbol waveform/delay amount estimation section
29 symbol waveform/delay amount selection section
30 transmission timing control section
31 modulation section
32 address determination section
231a, 231b correlation section
232a spread code S1 storage section
232b spread code S2 storage section
233a, 233b wave detection section
234a, 234b amplitude/phase detection section
235 composition section
236 determination section
237 differential detection section
238 post detection filter
239 data determination section
281a to 281d correlation section
282a reference waveform R1 storage section
282b reference waveform R2 storage section
282c reference waveform RA storage section
282d reference waveform RB storage section
282e reference waveform RC storage section
282f reference waveform RD storage section
283c timing determination section
311 primary modulation section
312 reading control section
313 waveform output section
314 secondary modulation section
315 spread code control section
316 spreading section
317 D/A converter
318a waveform 1 generation section
318b waveform 2 generation section
319 selector

DETAILED DESCRIPTION OF THE INVENTION

Hereinafter, embodiments of the present invention will be described with reference to the drawings.

In the embodiments described below, a case where a wireless transmission system according to the present invention includes a plurality of wireless stations for transmitting and receiving packets, respectively, by using a modulation/demodulation scheme with an anti-multipath property will be described. A wireless station, among the plurality of wireless stations, for initially transmitting a packet is referred to as a transmitting station. A wireless station there among corresponding to a final destination to which the transmitting station transmits a packet is referred to as a receiving station. Further, a wireless station there among, provided in a communication area of the transmitting station or the receiving station, for relaying, to the receiving station, a packet transmitted by the transmitting station, is referred to as a relay station.

As an exemplary wireless transmission system according to the present invention, a system (A) for modulating, in the transmitting station, a packet by using the spread spectrum scheme (for example, the DSSS scheme, the FHSS scheme, the THSS scheme, and the like), and demodulating, in the receiving station, the packet by using the spread spectrum scheme, a system (B) for modulating, in the transmitting station, a packet by using the OFDM scheme, and demodulating, in the receiving station, the packet by using the OFDM scheme, a system (C) for modulating, in the transmitting station, a packet by using the anti-multipath modulation scheme (for example, the PSK-VP scheme, the PSK-RZ scheme, the DSK scheme, and the like) having a redundant waveform in a symbol, and demodulating, in the receiving station, the packet by using a demodulation scheme corresponding to the anti-multipath modulation scheme, a system (D) for modulating, in the transmitting station, a packet by using a single carrier modulation scheme (for example, the PSK scheme, the QAM scheme, and the like), and demodulating, in the receiving station, the packet by using an equalizer using a tapped delay line, or the like, are used.

As another exemplary wireless transmission system according to the present invention, a system in which a principle of (A) or (C) described above is applied may be used. Specifically, as a system in which system (A) described above is applied, a system (E) may be used in which a plurality of transmitting stations perform spreading by using individual spread codes (symbol waveforms), and the receiving station performs RAKE-reception, that is, the receiving station performs de-spreading for a plurality of the spread codes, and thereafter combines path wavelets so as to include the respective spread codes, thereby demodulating a packet. Further, as a system in which system (C) described above is applied, a system (F) may be used in which a plurality of transmitting stations add individual redundant waveforms (symbol waveform such as a phase redundant waveform or an amplitude redundant waveform), and the receiving station automatically combines paths so as to include the respective redundant waveforms by using a demodulation scheme corresponding to the anti-multipath modulation scheme, thereby demodulating a packet.

In the systems (A), (B), (C), (D), (E), and (F), the plurality of the wireless stations apply amounts of delay different from each other to packets, respectively, and transmit the respective packets, thereby obtaining the path diversity effect. Each of the systems (E) and (F), among the systems, further uses a plurality of symbol waveforms which are different from each other and are not closely correlated with each other, thereby obtaining an enhanced path diversity effect. In each of the systems (E) and (F), the plurality of wireless stations at the transmission end transmit packets modulated by using symbol waveforms which are not closely correlated with each other, without applying the amounts of delay, respectively, thereby obtaining the path diversity effect.

The delay amount and the symbol waveform are each a parameter used for transmitting a packet, and are each a parameter for enabling achievement of the path diversity effect in the wireless transmission system. Hereinafter, a parameter such as a delay amount and a symbol waveform is referred to as a transmission parameter.

The wireless transmission system according to the present invention is not limited to any of exemplary systems (A), (B), (C), (D), (E), and (F) described above, and a system which may emerge in the future may be also used within the scope of the present invention.

Further, in each embodiment described below, the lower limit of the arrival time difference which enables achievement of the path diversity effect is referred to as a delay resolution, where as the upper limit thereof is referred to as a delay upper limit. The delay resolution and the delay upper limit of the arrival time difference may be defined in accordance with the principle of a modulation and demodulation scheme used for the wireless station, or may be defined in accordance with a parameter for the modulation and demodulation scheme and/or a limitation for mounting. In the systems (A) and (E), the delay resolution represents the length of one chip of a spread code. On the other hand, the delay upper limit represents a time shorter than a spread code length.

In the system (B), the delay upper limit represents a time of a guard interval, and the delay resolution represents a time corresponding to about the inverse of a frequency bandwidth including a plurality of subcarriers. In the OFDM scheme, an effect that no inter symbol interference occurs when the arrival time difference among the respective path wavelets is smaller than or equal to the guard interval can be obtained. Further, in the OFDM scheme, in general, error correction process is performed over a plurality of subcarriers. Even when an error occurs in a portion of the subcarriers due to multipath fading, the error correction process enables accurate demodulation of a received signal. Thus, when the OFDM scheme is used, an effect based on the guard interval, and a frequency diversity effect obtained by spreading signals over a wide frequency band and collecting the signals, are obtained, thereby obtaining the path diversity effect.

In each of the systems (C) and (F), the delay resolution represents a fraction of a symbol length, and the delay upper limit represents a time smaller than one symbol length. In the system (D), the delay resolution represents one symbol length, and the delay upper limit represents a time which is defined based on the number of taps.

FIRST EMBODIMENT

Hereinafter, a wireless transmission system 1 according to a first embodiment of the present invention will be described. Initially, a configuration of the wireless transmission system 1 according to the first embodiment will be described with reference to FIG. 1. FIG. 1 is a diagram illustrating a configuration of the wireless transmission system 1 according to the first embodiment. In the present embodiment, an exemplary case where the wireless transmission system 1 is the system (E) described above will be described. The system (E) is a system utilizing a principle of the DSSS scheme which is a type of the spread spectrum scheme. Further, in the system (E), a symbol waveform (spread code) and a delay amount may be used as the transmission parameter. A transmission time period for transmitting a packet among the respective wireless stations, which is sufficiently short as compared to the delay resolution of the arrival time difference, is neglected in the following description.

In FIG. 1, the wireless transmission system 1 comprises a transmitting station 11, relay stations 121 to 124, and a receiving station 13. The transmitting station 11, the relay stations 121 to 124, and the receiving station 13 have the same configuration. The configuration of each of the transmitting station 11, the relay stations 121 to 124, and the receiving station 13 will be described below. In FIG. 1, dotted line arrows indicate that a packet transmitted from the transmitting station 11 is received by each of the relay stations 121 to 124. Further, solid line arrows indicate that packets transmitted by the relay stations 121 to 124, respectively, are received by the receiving station 13. Specifically, the transmitting station 11 transmits a packet to be transmitted, as a transmission packet, as indicated by the dotted line arrows in FIG. 1. Each of the relay stations 121 to 124 receives the transmission packet transmitted from the transmitting station 11. When each of the relay stations 121 to 124 receives the transmission packet from the transmitting station 11, each of the relay stations 121 to 124 generates a relay packet representing the same packet as the received transmission packet. The relay stations 121 to 124 transmit the generated relay packets, respectively, as indicated by the solid line arrows in FIG. 1. The receiving station 13 receives the relay packets transmitted from the relay stations 121 to 124, respectively. Thus, a packet is wirelessly transmitted from the transmitting station 11 through the relay stations 121 to 124 to the receiving station 13 which is a final destination. That is, a packet is multihop-transmitted.

Although in FIG. 1 the number of the relay stations of the wireless transmission system 1 is four, the number of the relay stations is not limited thereto. The number of the relay stations of the wireless transmission system 1 may be equal to or smaller than three, or may be equal to or greater than five.

Figure 2:
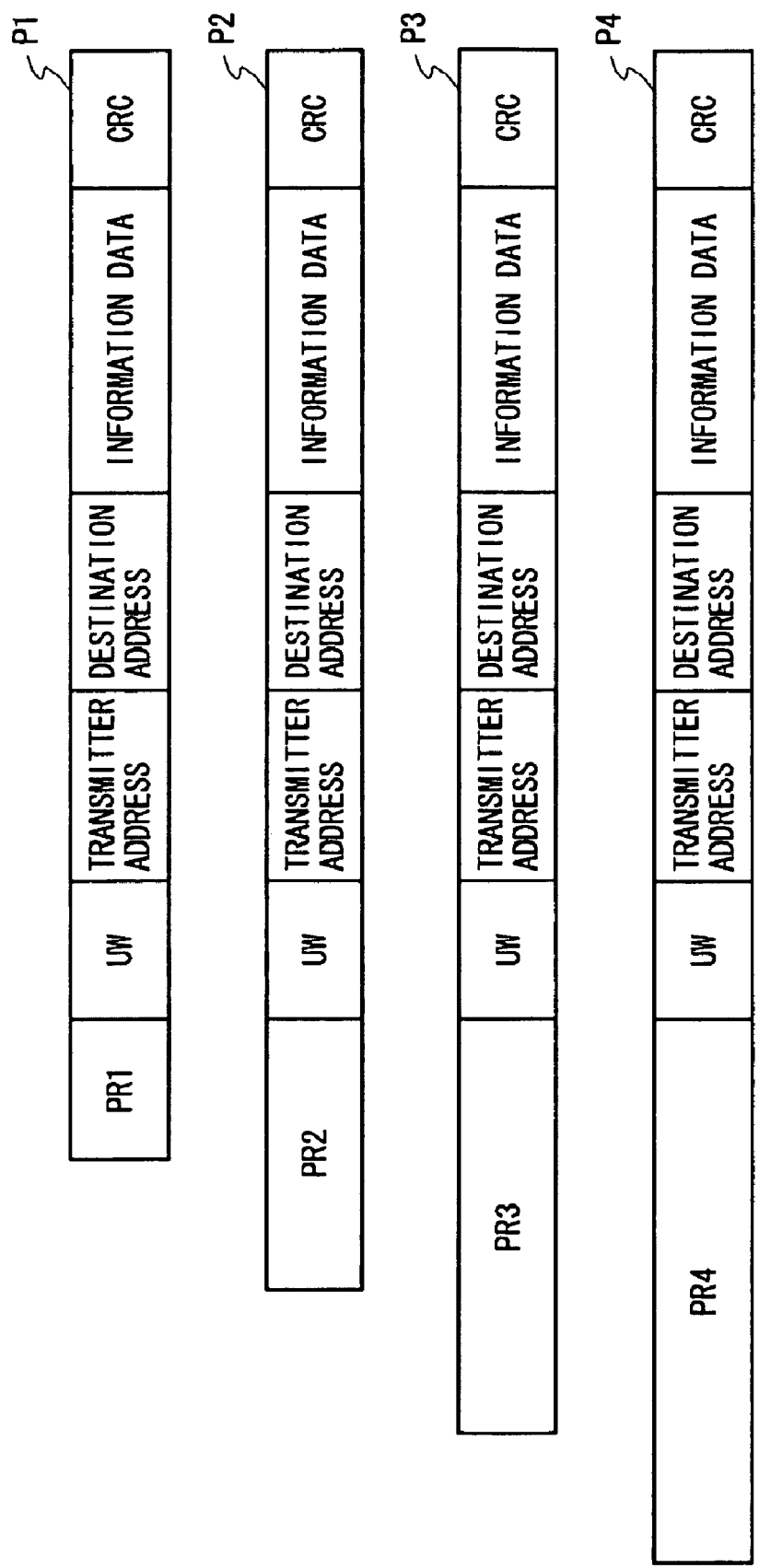
FIG. 2 is a diagram illustrating an exemplary structure of a packet.

Next, a structure of a packet may be described with reference to FIG. 2. FIG. 2 is a diagram illustrating an exemplary structure of a packet. In FIG. 2, packets P1, P2, P3 and P4 include preambles PR1, PR2, PR3, and PR4, respectively, and each of the packets P1, P2, P3 and P4 also include a unique word UW, a transmitter address, a destination address, information data, and a CRC.

The preambles PR1, PR2, PR3, and PR4 are each information in which a predetermined data sequence ("1010 . . . ", "1100 . . . ", or the like) is repeated. Here, the same data sequence is used for the preambles PR1, PR2, PR3, and PR4. Specifically, one type of data sequence is used for the preambles PR1, PR2, PR3, and PR4. Each of the preambles PR1, PR2, PR3, and PR4 is typically used for controlling a gain under AGC (Automatic Gain Control), reproduction of a clock, correction of a frequency, and the like. Each of the preambles PR1, PR2, PR3, and PR4 is also used for estimating a transmission parameter selected by a non-self station. The preamble PR1 is included in a head portion of a packet P1. The preamble PR2 is included in a head portion of a packet P2. The preamble PR3 is included in a head portion of a packet P3. The preamble PR4 is included in a head portion of a packet P4. Further, the preambles PR1, PR2, PR3, and PR4 have lengths different from each other. In an example shown in FIG. 2, the preamble PR1 has the shortest length of all the preambles, and the preamble PR4 has the longest length thereof.

The unique word UW represents information used for determination of a packet type, and packet synchronization. The transmitter address represents an address of the transmitting station 11 which is a packet transmitter. The destination address represents an address of the receiving station 13 which is a final destination to which a packet is transmitted. The information data represents a body of data to be transmitted from the transmitting station 11 to the receiving station 13. The CRC is a CRC (Cyclic Redundancy Check) code. The CRC is used for error detection. Data of the unique word UW and the following data are the same among all the packets P1, P2, P3, and P4.

Figure 3:
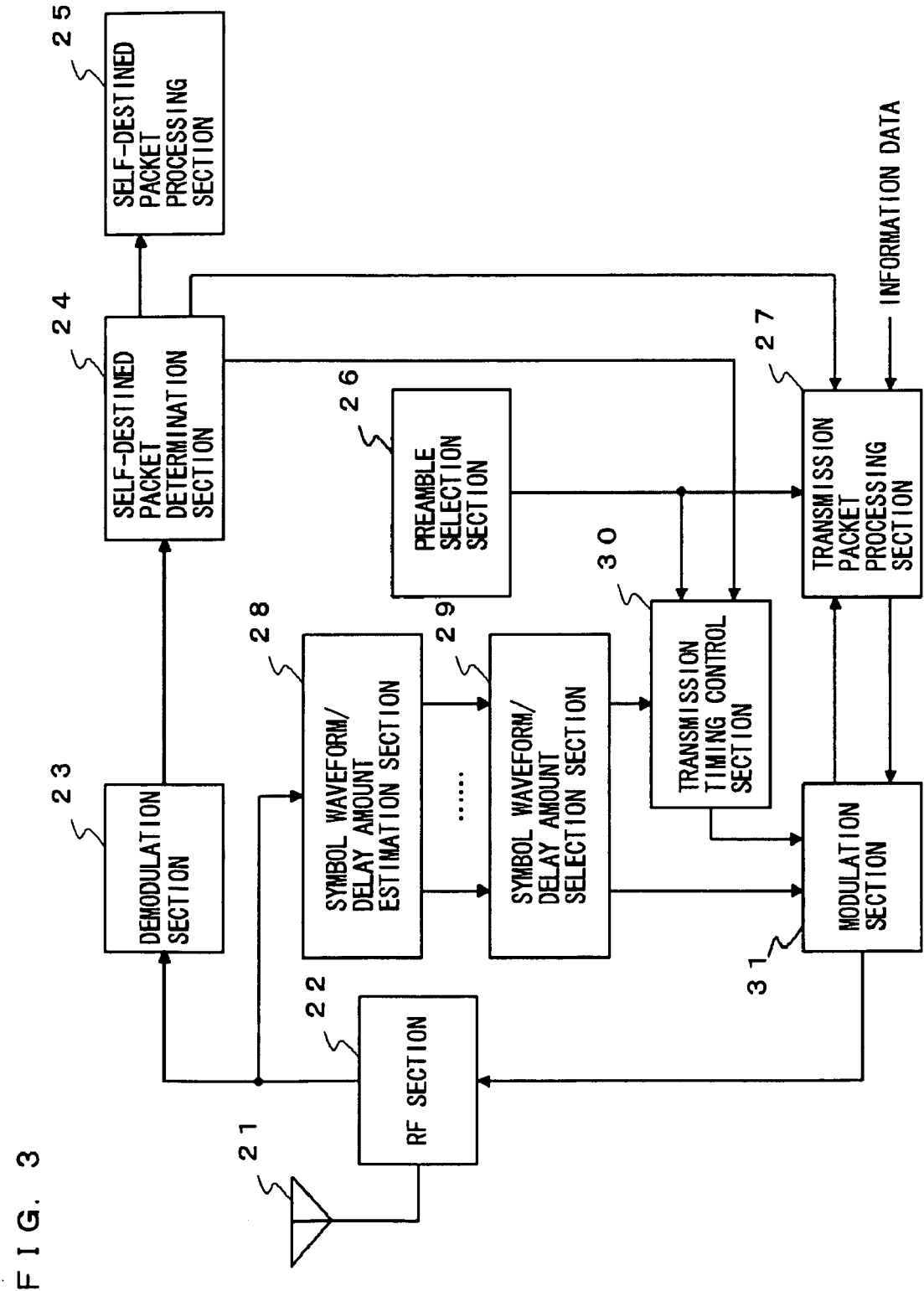
FIG. 3 is a block diagram illustrating a configuration of a wireless station according to the first embodiment.

Next, a configuration of the wireless station according to the first embodiment will be described with reference to FIG. 3. FIG. 3 is a block diagram illustrating a configuration of the wireless station according to the first embodiment. The transmitting station 11, the relay stations 121 to 124, and the receiving station 13, which perform processes, respectively, different from each other, have the same configuration, which is shown in FIG. 3.

In FIG. 3, the wireless station according to the present embodiment comprises: an antenna 21; an RF section 22; a demodulation section 23; a self-destined packet determination section 24; a self-destined packet processing section 25; a preamble selection section 26; a transmission packet processing section 27; a symbol waveform/delay amount estimation section 28; a symbol waveform/delay amount selection section 29; a transmission timing control section 30; and a modulation section 31.

The RF section 22 frequency-converts, to a baseband signal, an RF (Radio Frequency) band signal received by the antenna 21, so as to output a received baseband signal. The RF section 22 also frequency-converts, to an RF band signal, a modulated baseband signal outputted by the modulation section 31, and outputs the RF band signal to the antenna 21. The RF band signal outputted by the RF section 22 is transmitted from the antenna 21. The demodulation section 23 demodulates the received baseband signal outputted from the RF section 22 to obtain digital data, so as to output demodulated data.

When the self-destined packet determination section 24 detects the unique word from the demodulated data outputted by the demodulation section 23, the self-destined packet determination section 24 determines that a packet has been received. Further, the self-destined packet determination section 24 subjects the received packet to the CRC check by using the CRC detected from the demodulated data. When the packet includes no error, the self-destined packet determination section 24 generates a reception completion signal indicating that the reception of the packet is completed. The reception completion signal is outputted to the transmission timing control section 30. Further, the self-destined packet determination section 24 determines whether or not the received packet is destined for the self station, by using the destination address detected from the demodulated data. Specifically, the self-destined packet determination section 24 determines whether or not the destination address is the same as the address of the self station. When the destination address is the same as the address of the self station, the self-destined packet determination section 24 determines that the received packet is a packet (herein after, referred to as an self-destined packet) destined for the self station. In this case, the self-destined packet determination section 24 outputs the self-destined packet to the self-destined packet processing section 25. On the other hand, when the destination address is not the same as the address of the self station, the self-destined packet determination section 24 determines that the received packet is a packet (herein after, referred to as a non-self-destined packet) destined for a non-self station. In this case, the self-destined packet determination section 24 outputs the non-self-destined packet to the transmission packet processing section 27. The self-destined packet processing section 25 subjects, to a predetermined process, the self-destined packet outputted by the self-destined packet determination section 24.

As described above, a series of processes performed by the self-destined packet determination section 24 and the self-destined packet processing section 25 when the wireless station receives the self-destined packet, is a process performed when the wireless station is used as the receiving station 13. Further, as described below, a series of processes from reception of information data from the outside to transmission of a transmission packet is a process performed when the wireless station is used as the transmitting station 11. Further, a series of processes, from reception of a non-self-destined packet to transmission of a relay packet, performed when the wireless station receives the non-self-destined packet, is a process performed when the wireless station is used as any of the relay stations 121 to 124. When the wireless station is used as the relay station, a transmission packet transmitted from the transmitting station 11 is used as a non-self-destined packet.

In the preamble selection section 26, information relating to a plurality of preamble lengths are previously stored. Hereinafter, the preamble length is referred to as a PR length. The plurality of PR lengths are different from each other. The preamble selection section 26 selects one of the plurality of PR lengths at random. In other words, the preamble selection section 26 selects any one of the plurality of PR lengths with equal probability. The preamble selection section 26 generates a preamble signal representing the selected PR length, and outputs the preamble signal to the transmission packet processing section 27 and the transmission timing control section 30.

The preamble selection section 26 may not necessarily select anyone of the plurality of PR lengths with equal probability. The PR lengths may be selected with various probabilities, respectively. In the following description, however, the preamble selection section 26 selects any one of the plurality of PR lengths with equal probability.

When information data is inputted from the outside, the transmission packet processing section 27 adds, to the information data, an appropriate preamble, unique word, transmitter address, destination address, and CRC, sodas to generate a transmission packet. The destination address included in the transmission packet is an address of the receiving station 13 corresponding to the final destination to which the packet is to be transmitted, as described with reference to FIG. 2. The transmission packet is stored in the transmission packet processing section 27. The transmission packet processing section 27 replaces a preamble included in a transmission packet which is a non-self-destined packet inputted from the self-destined packet determination section 24, with a preamble having the PR length represented by the preamble signal. Specifically, the transmission packet processing section 27 changes the PR length of the non-self-destined packet to the PR length represented by the preamble signal. The packet having the preamble replaced is stored as a relay packet in the transmission packet processing section 27.

The symbol waveform/delay amount estimation section 28 estimates a combination of a symbol waveform and a delay amount, which has been selected by a non-self wireless station, based on a preamble, included in the received baseband signal, of a packet which is transmitted by the non-self wireless station. The symbol waveform/delay amount estimation section 28 performs the estimation during a period from a timing at which the self-destined packet determination section 24 outputs the reception completion signal to an estimation completion timing. The estimation completion timing is a timing at which the estimation of the combination thereof is completed. When an estimation result is obtained at or before the estimation completion timing, the symbol waveform/delay amount estimation section 28 generates an estimation result signal representing an estimated combination. The generated estimation result signal is outputted to the symbol waveform/delay amount selection section 29. The symbol waveform/delay amount estimation section 28 will be described below in detail.

In the symbol waveform/delay amount selection section 29, a plurality of combinations of a symbol waveform and a delay amount are previously stored. The plurality of combinations thereof are different from each other. When the estimation result signal is obtained, the symbol waveform/delay amount selection section 29 selects, at random, one of the plurality of combinations other than the combination represented by the estimation result signal. When the estimation result signal is not obtained, the symbol waveform/delay amount selection section 29 selects one of the plurality of combinations at random. The symbol waveform/delay amount selection section 29 generates a symbol waveform signal representing a symbol waveform of the selected combination. The symbol waveform signal is outputted to the modulation section 31. Further, the symbol waveform/delay amount selection section 29 generates a delay amount signal representing a delay amount of the selected combination. The delay amount signal is outputted to the transmission timing control section 30.

The transmission timing control section 30 determines a criterion timing based on the reception completion signal outputted by the self-destined packet determination section 24. The criterion timing represents a timing used as a reference for determining a transmission start timing at which transmission of a relay packet is started. Here, described is an example where a timing at which a predetermined waiting time elapses from a timing at which the reception completion signal is inputted is used as the criterion timing. The transmission timing control section 30 determines the transmission start timing based on the determined criterion timing, a delay amount represented by the delay amount signal outputted by the symbol waveform/delay amount selection section 29, the PR length represented by the preamble signal outputted by the preamble selection section 26, and the PR length which is shortest of a plurality of PR lengths which are allowed to be selected by the preamble selection section 26. The transmission start timing is a timing which is earlier, by a time represented by a difference between the PR length represented by the preamble signal and the PR length which is shortest of the plurality of PR lengths which are allowed to be selected by the preamble selection section 26, than a timing delayed from the criterion timing by the delay amount represented by the delay amount signal. The transmission timing control section 30 generates, at the transmission start timing, a transmission start signal for indicating that the transmission is to be started, and outputs the generated transmission start signal to the modulation section 31.

The modulation section 31 reads, from the transmission packet processing section 27, a transmission packet based on the information data from the outside at a timing based on an instruction from the outside. The modulation section 31 modulates the read transmission packet by using the symbol waveform based on an instruction from the outside, so as to output a modulated baseband signal. Further, when the transmission start signal is inputted, the modulation section 31 reads a relay packet from the transmission packet processing section 27. The modulation section 31 modulates the read relay packet by using the symbol waveform represented by the symbol waveform signal, so as to output a modulated baseband signal. The modulated baseband signal is frequency-converted to an RF band signal by the RF section 22, and thereafter transmitted from the antenna 21.

Next, the symbol waveform/delay amount estimation section 28 will be described in detail with reference to FIG. 4. Here, two parameters, a symbol waveform and a delay amount, are used as the transmission parameter. Further, two types of symbol waveform, w1 and w2, are used, and two amounts, 0 and T, of delay are used. In this case, the number of types of the combination of the symbol waveform and the delay amount is 2×2=4, that is, the number of the transmission parameters is four, and the maximum number of effective branches is four. That is, it is possible to obtain the path diversity effect of up to four branches. The maximum number of effective branches represents the maximum number of effective branches which can contribute to the path diversity effect. Further, in the present embodiment, the system (E) is used, and therefore the differences (T−0=T) between the respective amounts of delay are greater than or equal to one chip length, and is smaller than the spread code length.

Figure 4:
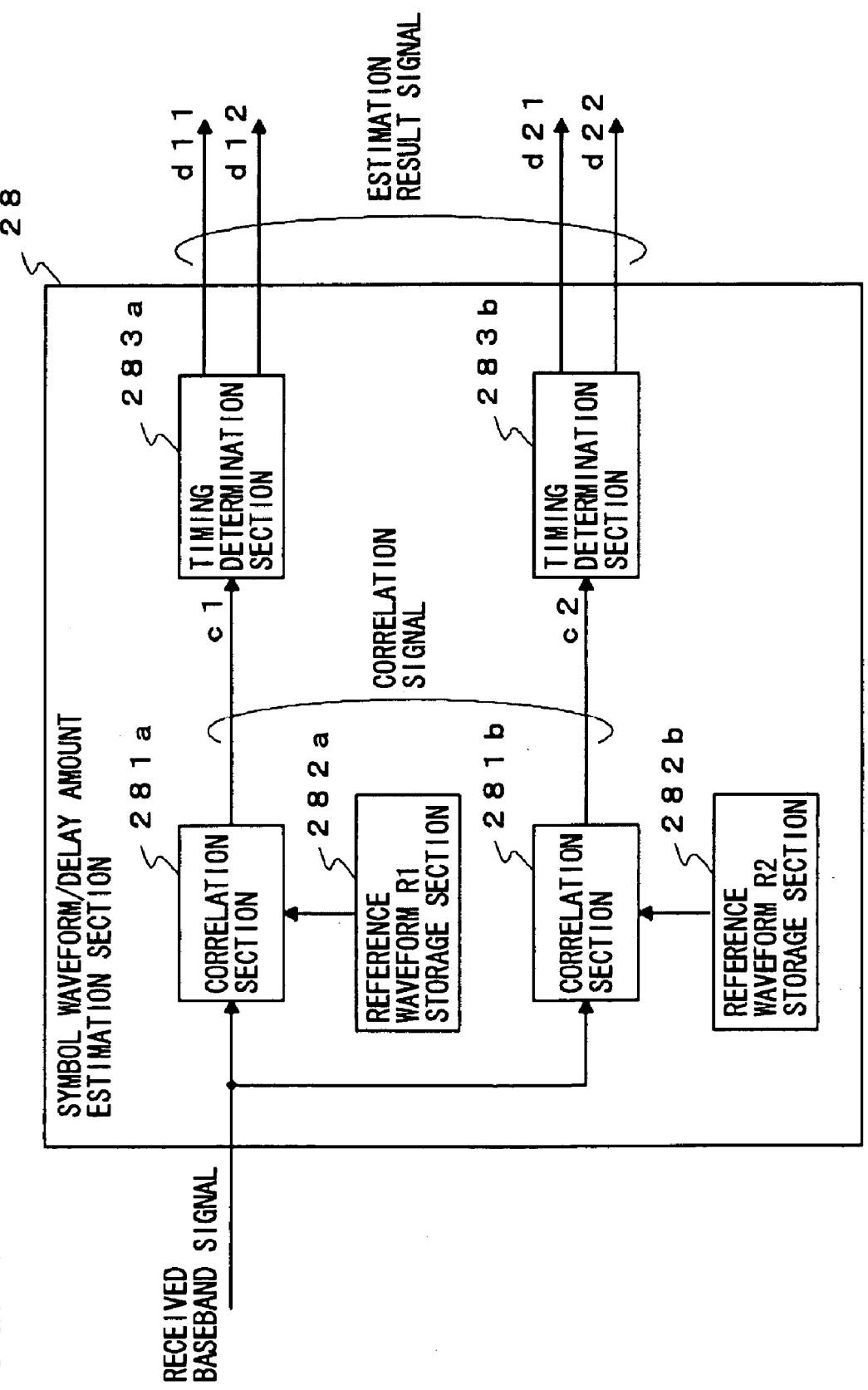
FIG. 4 is a block diagram illustrating in detail a configuration of a symbol waveform/delay amount estimation section 28.

FIG. 4 is a block diagram illustrating in detail a configuration of the symbol waveform/delay amount estimation section 28. In FIG. 4, the symbol waveform/delay amount estimation section 28 includes: correlation sections 281*a* and 281*b*; a reference waveform R1 storage-section 282*a*; a reference waveform R2 storage section 282*b*, and timing determination sections 283*a* and 283*b*.

The reference waveform R1 storage section 282*a* stores, as a reference waveform R1, waveform data of the preamble portion obtained through modulation using the symbol waveform w1. The reference waveform R2 storage section 282*b* stores, as a reference waveform R2, waveform data of the preamble portion obtained through modulation using the symbol waveform w2. The received baseband signal is inputted to each of the correlation sections 281a and 281b. The correlation section 281a obtains a correlation between the received baseband signal and the reference waveform R1 stored in the reference waveform R1 storage section. The correlation section 281a compares the correlation result with a predetermined threshold value so as to detect for a peak, and outputs a correlation signal c1. When the relay packet including the preamble obtained through modulation using the symbol waveform w1 is received, outputted is the correlation signal c1 representing a peak appearing at intervals of the length of the reference waveform R1. Further, when a plurality of the relay packets each including the preamble obtained through modulation using the symbol waveform w1 are superimposed on each other and received at various times, outputted is the correlation signal c1 representing peaks, corresponding to the respective relay packets, which are superimposed on each other. When the relay packet including the preamble obtained through modulation using a symbol waveform other than the symbol waveform w1 is received, a signal representing a noise or the like is outputted as the correlation signal c1. That is, in this case, no peak is detected. Similarly, the correlation section 281b obtains a correlation between the received baseband signal and the reference waveform R2 stored in the reference waveform R2 storage section, so as to eventually output a correlation signal c2.

The timing determination section 283a compares the correlation signal c1 with the reference timing so as to estimate a delay amount of the relay packet obtained through modulation using the symbol waveform w1. The reference timing is generated by a counter for making a count at intervals represented by the reference waveform R1 or R2, by using, as a trigger, a timing at which the self-destined packet determination section 24 outputs the reception completion signal. The intervals represented by the reference waveform R1 are equal to the intervals represented by the reference waveform R2. Further, as described above, only two amounts (0, T) of delay are used. Therefore, the timing determination section 283a compares the reference timing with the peak represented by the correlation signal c1, so as to determine whether the delay amount represented by the peak is 0 or T. The determination method will be described below in more detail. When the delay amount is determined as 0, the timing determination section 283a generates and outputs an estimation result signal d11 representing the determination result. On the other hand, when the delay amount is determined as T, the timing determination section 283a generates and outputs an estimation result signal d12 representing the determination result.

The estimation result signals d11 and d12 are each a signal representing a result based on the peak represented by the correlation signal c1. Therefore, for example, that the estimation result signal d11 is outputted means that the received baseband signal includes the relay packet which is obtained through modulation using the symbol waveform w1, and has an amount 0 of delay. On the other hand, that the estimation result signal d12 is outputted means that the received baseband signal includes the relay packet which is obtained through modulation using the symbol waveform w1, and has an amount T of delay.

Similarly, the timing determination section 283b compares the correlation signal c2 with the reference timing so as to estimate a delay amount of the relay packet obtained through modulation using the symbol waveform w2. Specifically, the timing determination section 283b compares a peak represented by the correlation signal c2 with the reference timing so as to determine whether a delay amount represented by the peak is 0 or T. When the delay amount is determined as 0, the timing determination section 283b generates and outputs the estimation result signal d21 representing the determination result. On the other hand, when the delay amount is determined as T, the timing determination section 283b generates and outputs the estimation result signal d22 representing the determination result.

The symbol waveform/delay amount estimation section 28 performs the estimation process during a period from a timing at which the self-destined packet determination section 24 outputs the reception completion signal to the estimation completion timing. The estimation completion timing is a timing which is earlier than the criterion timing by a time difference between the PR length selected by the preamble selection section 26 and the PR length which is shortest of the PR lengths which are previously stored in the preamble selection section 26. Here, the criterion timing is a timing at which the transmission of the relay packet having the shortest PR length and an amount 0 of delay is started. The symbol waveform/delay amount estimation section 28 reads the criterion timing and each PR length from the transmission timing control section 30, so as to determine the estimation completion timing. Further, the symbol waveform/delay amount estimation section 28 reads, from the transmission timing control section 30, a timing at which the reception completion signal has been outputted so as to set, as a timing at which the estimation is to be started, a timing at which the reception completion signal has been outputted.

The number of the estimation result signals outputted by each of the timing determination sections 283a and 283b is equal to the number of the amounts of delay used by the wireless transmission system 1. Therefore, when the wireless transmission system 1 uses three amounts of delay, the number of the estimation result signals outputted by the timing determination section 283a is three, and the number of the estimation result signals outputted by the timing determination section 283b is also three. In this case, differences among the respective amounts of delay may be grater than or equal to one chip length, and a difference between the maximum delay amount and the minimum delay amount may be smaller than the spread code length.

As described above, when the symbol waveform/delay amount estimation section 28 shown in FIG. 4 is used, a symbol waveform and a delay amount are estimated based on the waveform correlation, and therefore a symbol waveform and a delay amount of each of a plurality of packets superimposed on each other can be estimated. When a symbol waveform and a delay amount are estimated based on the waveform correlation, the minimum length, necessary for the estimation, of the preamble of the received baseband signal may be about one symbol length, which means that the minimum length may be short. Therefore, differences among the PR lengths of the respective packets P1, P2, P3, and P4 shown in FIG. 2 may be small, thereby obtaining an effect that deterioration of transmission efficiency is prevented. Further, although a case where the symbol waveform/delay amount estimation section 28 shown in FIG. 4 handles 2 types of symbol waveforms is described, the number of the types of the symbol waveform may be greater than or equal to three. In this case, the symbol waveform/delay amount estimation section 28 shown in FIG. 4 may have the same number of the correlation sections, the reference waveform storage sections, and the timing determinations sections, as the types of the symbol waveform.

Figure 5:
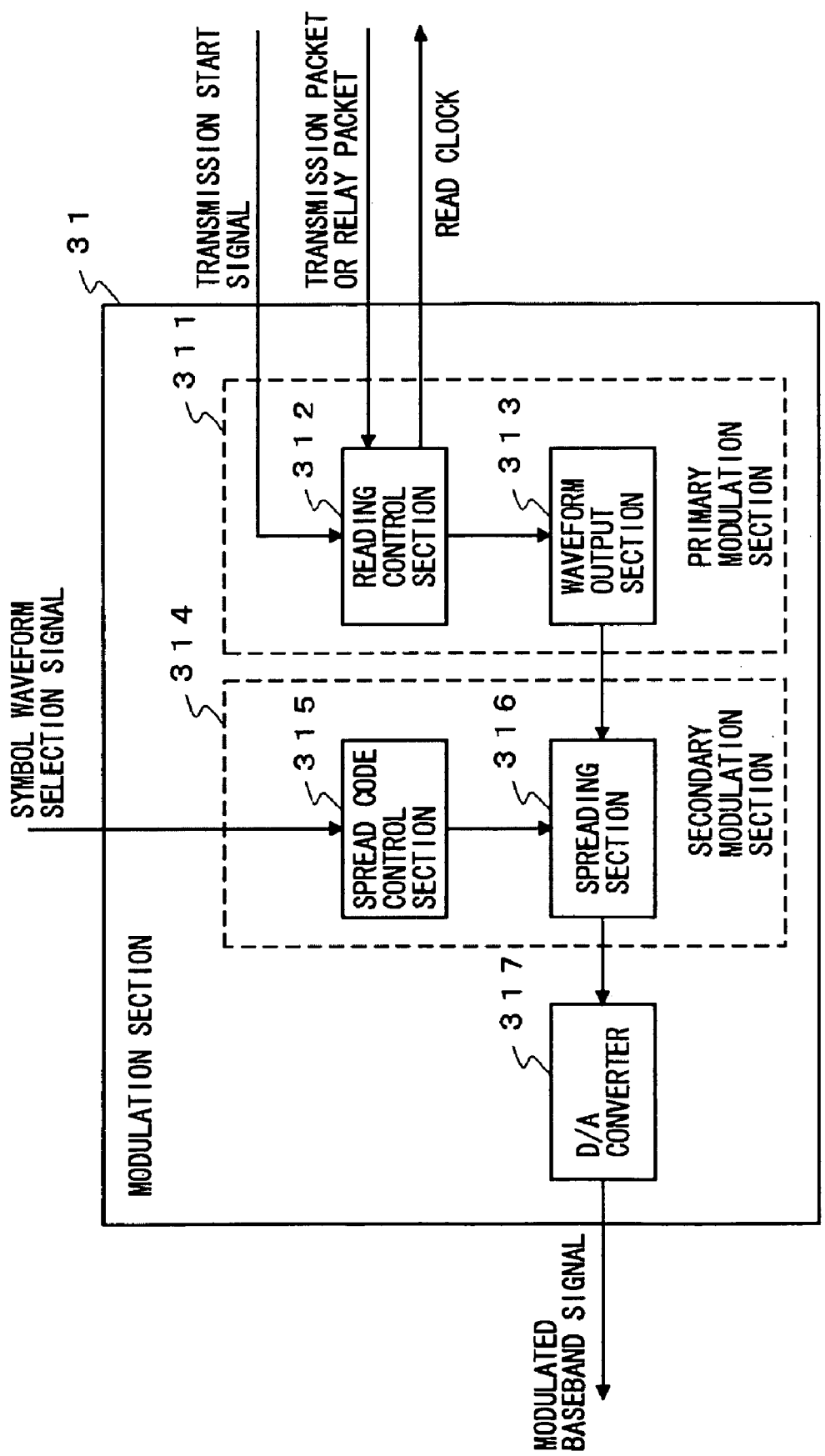
FIG. 5 is a diagram illustrating a configuration of a modulation section 31 used for a system (E).
Figure 6:
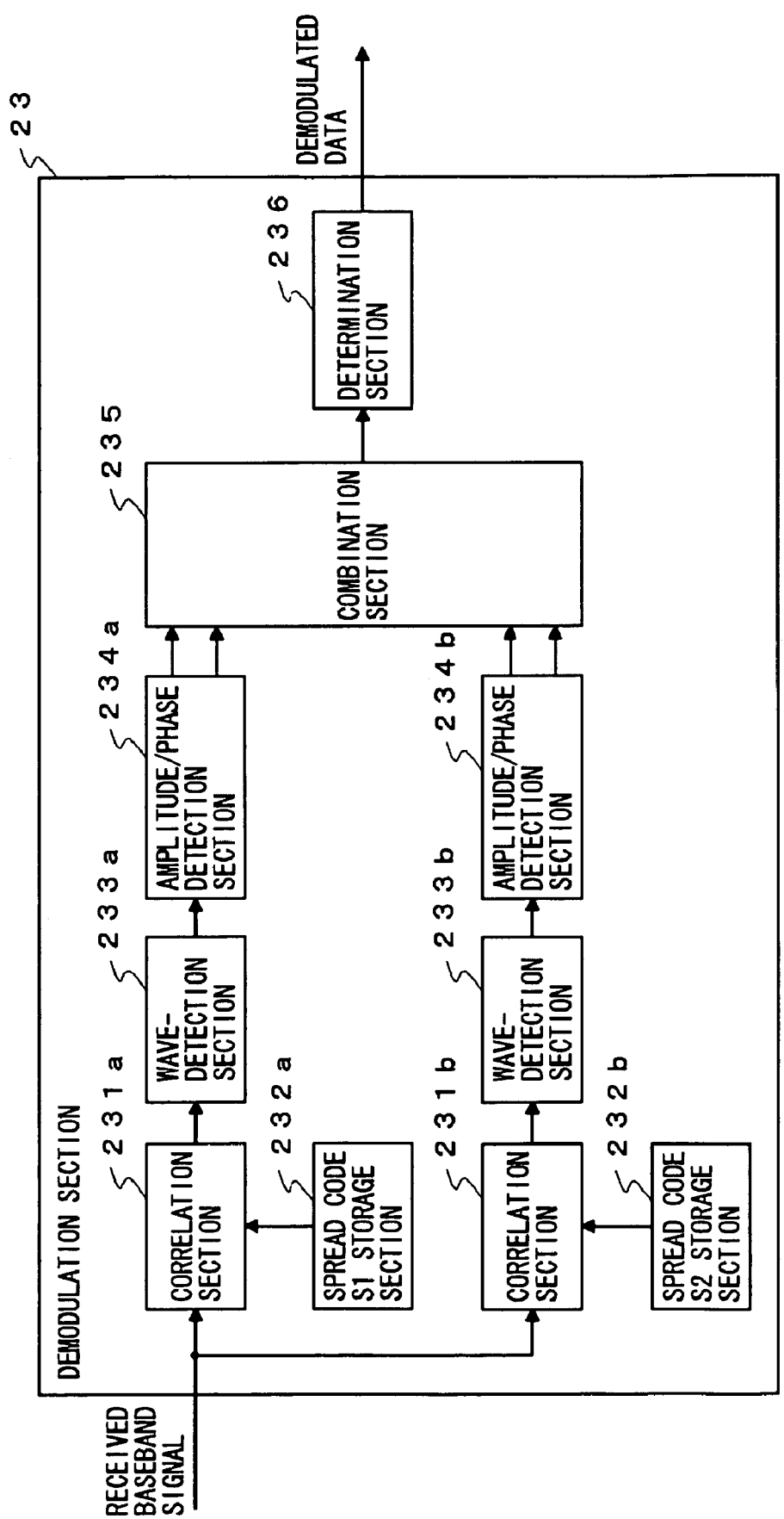
FIG. 6 is a diagram illustrating a configuration of a demodulation section 23 used for a system (E).

Next, a configuration of each of the modulation section 31 and the demodulation section 23 will be described in detail with reference to FIG. 5 and FIG. 6. In the present embodiment, the system (E) described above is used as the wireless transmission system 1. Therefore, FIG. 5 shows a configuration of the modulation section 31 used for the system (E). FIG. 6 shows a configuration of the demodulation section 23 used for the system (E).

In FIG. 5, the modulation section 31 mainly includes a primary modulation section 311, a secondary modulation section 314, and a D/A converter 317. The primary modulation section 311 includes a reading control section 312, and a waveform output section 313. The secondary modulation section 314 includes a spread code control section 315 and a spreading section 316.

The reading control section 312 is a counter operating based on a base clock. When the transmission start signal is inputted from the transmission timing control section 30, the reading control section 312 generates, based on a counted value, a read clock for reading a relay packet. The reading control section 312 outputs the generated read clock to the transmission packet processing section 27. The transmission packet processing section 27 reads a relay packet in accordance with the inputted read clock, and outputs the relay packet to the reading control section 312 of the modulation section 31. When the relay packet is read from the transmission packet processing section 27, the reading control section 312 subjects the relay packet to differential encoding as necessary. Thereafter, the reading control section 312 generates an address signal representing an address used when the waveform output section 313 reads data of a modulation waveform, and outputs the generated address signal to the waveform output section 313. The waveform output section 313 has a waveform memory. Data of the modulated waveform are previously stored in the waveform memory. The waveform output section 313 reads, from the waveform memory, data of the modulated waveform in accordance with the address signal, and outputs, as a primary modulated signal, the read data of the modulated waveform. The spread code control section 315 generates a spread code in accordance with the symbol waveform signal outputted by the symbol waveform/delay amount selection section 29. The spreading section 316 spreads the primary modulated signal by using the spread code generated by the spread code control section 315. The D/A converter 317 converts the spread primary modulated signal from a digital signal to an analog signal, so as to output a modulated baseband signal.

As described above, the modulation section 31 shown in FIG. 5 modulates, when the transmission start signal is received, there lay packet by using the spread code based on the symbol waveform determined by the symbol waveform/delay amount selection section 29. Further, the modulation section 31 shown in FIG. 5 is able to apply, to the relay packet, a delay amount determined by the symbol waveform/delay amount selection section 29, and transmit the relay packet. A timing at which the modulated baseband signal is to be outputted is determined on a base clock basis in accordance with a timing at which the transmission start signal is received. Further, in general, a frequency which is about several to ten-odd times a symbol frequency (an inverse of a symbol length) is often used as the base clock. Therefore, the modulation section 31 is allowed to adjust a timing at which the modulated baseband signal is outputted, in increments of about one-nineteenth to about half the symbol length. As a result, a delay amount determined by the symbol waveform/delay amount selection section 29 can be added to the relay packet to be transmitted.

On the other hand, the modulation section 31 reads, from the transmission packet processing section 27, the transmission packet based on the information data from the outside, at a timing based on the instruction from the outside. The modulation section 31 modulates the read transmission packet by using a symbol waveform based on the instruction from the outside, so as to output a modulated baseband signal. The reading control section 312 generates a read clock for reading a transmission packet, based on a counted value, at a timing based on the instruction from the outside. The reading control section 312 outputs the generated read clock to the transmission packet processing section 27. The transmission packet processing section 27 reads a transmission packet in accordance with the inputted read clock, and outputs the transmission packet to the reading control section 312 of the modulation section 31. When the transmission packet is read from the transmission packet processing section 27, the reading control section 312 subjects the transmission packet to differential encoding as necessary. Thereafter, the reading control section 312 generates an address signal representing an address used when the waveform output section 313 reads data of a modulation waveform, and outputs the generated address signal to the waveform output section 313. The waveform output section 313 reads, from the waveform memory, the data of the modulated waveform in accordance with the address signal, and outputs the read data of the modulated waveform as a primary modulated signal. The spread code control section 315 generates a spread code in accordance with a symbol waveform based on the instruction from the outside. The spreading section 316 spreads the primary modulated signal by using the spread code generated by the spread code control section 315. The D/A converter 317 converts the spread primary modulated signal from a digital signal to an analog signal, so as to output a modulated baseband signal.

In FIG. 6, the demodulation section 23 includes: correlation sections 231a and 231b; a spread code S1 storage section 232a; a spread code S2 storage section 232b; wave detection sections 233a and 233b; amplitude/phase detection sections 234a and 234b; a combination section 235; and a determination section 236.

The received baseband signal is inputted to each of the correlation sections 231a and 231b. The correlation section 231a obtains a correlation between the received baseband signal and a spread code S1 stored in the spread code S1 storage section 232a so as to subject the received baseband signal to de-spreading. The received baseband signal having been subjected to the de-spreading is outputted to the wave detection section 233a as a de-spread signal. The wave detection section 233a wave-detects the de-spread signal outputted by the correlation section 231a, and generates a wave-detected signal. The amplitude/phase detection section 234a detects an amplitude and a phase of the wave-detected signal generated by the wave detection section 233a, and outputs the amplitude and the phase as amplitude information and phase information, respectively. Similarly, the correlation section 231b obtains a correlation between the received baseband signal and a spread code S2 stored in the spread code S2 storage section 232b so as to subject the received baseband signal to de-spreading. The received base band signal having been subjected to the de-spreading is outputted to the wave detection section 233b as a de-spread signal. The wave detection section 233b wave-detects the de-spread signal outputted by the correlation section 231b, and generates a wave-detected signal. The amplitude/phase detection section 234b detects an amplitude and a phase of the wave-detected signal generated by the wave detection section 233b, and outputs the amplitude and the phase as amplitude information and phase information, respectively.

The combination section 235 combines the wave-detected signals outputted by the amplitude/phase detection sections 234a and 234b, respectively, based on the amplitude information and the phase information, so as to generate a combination signal. The determination section 236 code-determinates the combination signal. A signal having been code-determined by the determination section 236 is outputted to the self-destined packet determination section 24 as demodulated data.

As described above, the demodulation section 23 shown in FIG. 6 obtains a correlation between the received baseband signal and each of a plurality of spread codes, so as to separate and combine a signal (path) obtained by superimposing packets transmitted from the respective wireless stations on each other. Therefore, the path diversity effect can be obtained. Further, although the demodulation section 23 shown in FIG. 6 uses two types of spread codes, the number of spread codes may be greater than or equal to three. In this case, the demodulation section 23 shown in FIG. 6 may have the same number of the correlation sections, the spread code storage sections, the wave detection sections, and the amplitude/phase detection sections as the types of the spread code.

Figure 7:
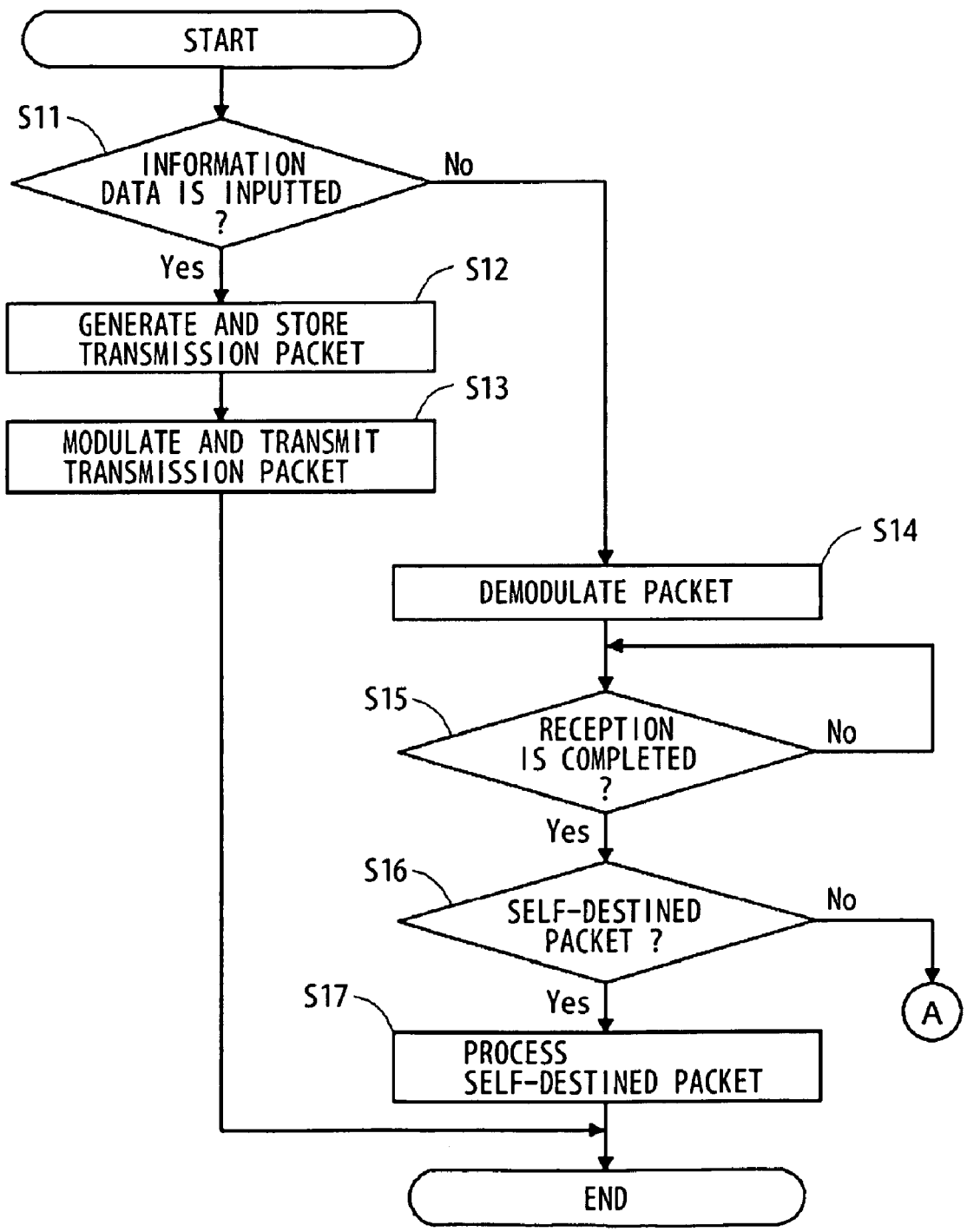
FIG. 7 is a flow chart illustrating an operation performed by the wireless station according to the first embodiment.
Figure 8:
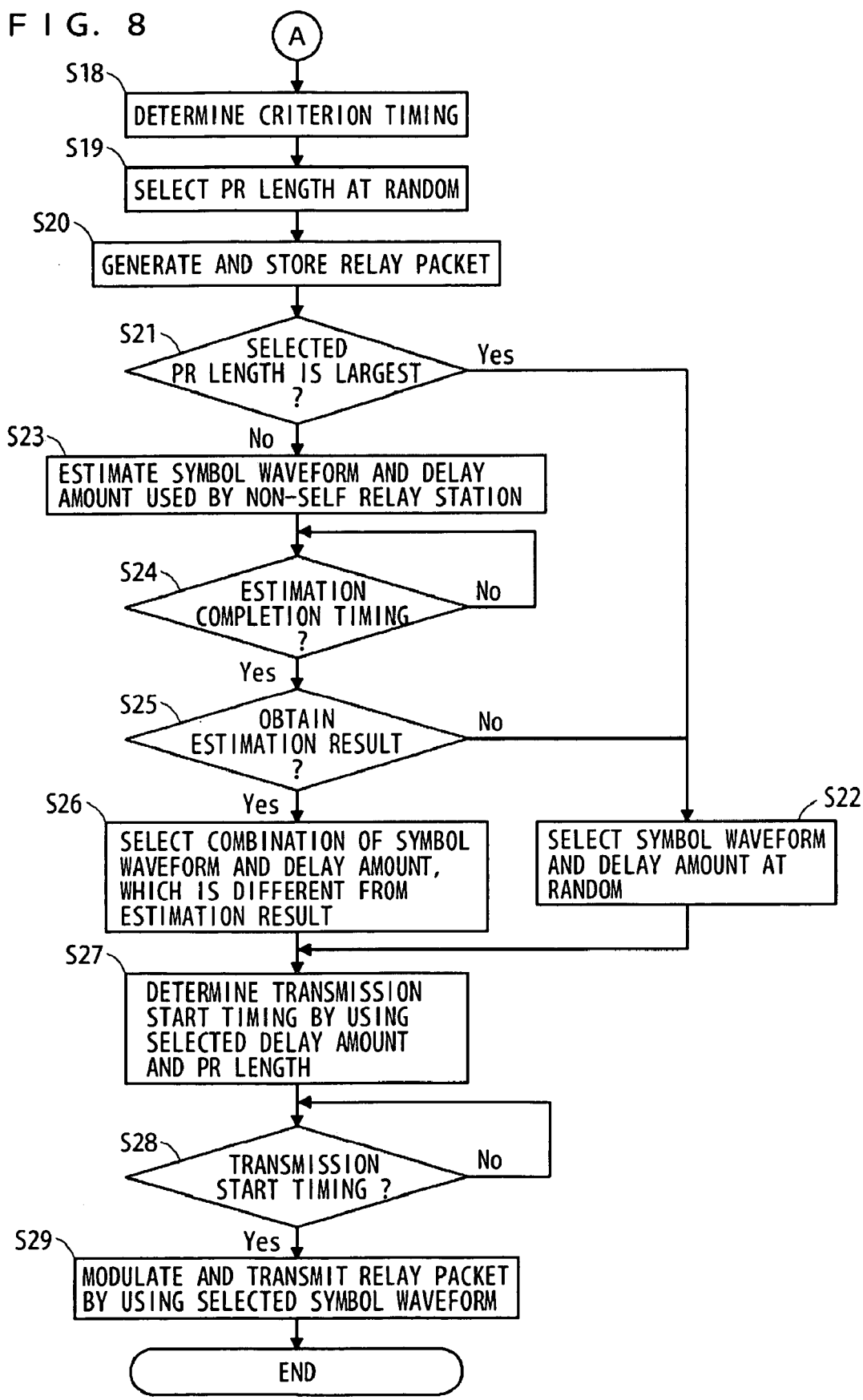
FIG. 8 is a flow chart illustrating an operation performed by the wireless station according to the first embodiment.

Next, an operation performed by the wireless station according to the first embodiment will be described with reference to FIG. 7 and FIG. 8. FIG. 7 and FIG. 8 are flowcharts illustrating an operation performed by the wireless station according to the first embodiment.

In FIG. 7, the transmission packet processing section 27 determines whether or not the information data is inputted from the outside (step S11). When the information data is determined as being inputted (Yes in step S11), the transmission packet processing section 27 adds a preamble and the like to the information data so as to generate a transmission packet, and stores the generated transmission packet (step S12). Following step S12, in step S13, the modulation section 31 reads the transmission packet from the transmission packet processing section 27, and modulates the transmission packet by using a symbol waveform based on the instruction from the outside, so as to output a modulated baseband signal. Further, the modulated baseband signal is frequency-converted to an RF band signal by the RF section 22, and there after transmitted from the antenna 21. The process steps of steps 11 to S13 described above are performed when the wireless station is used as the transmitting station 11.

On the other hand, when it is determined that the information data is not inputted (No in step S11), and a packet transmitted from a non-self wireless station is received by the antenna 21, the demodulation section 23 demodulates the received packet, and outputs demodulated data (step S14). The self-destined packet determination section 24 determines whether or not reception of the packet is completed, by using the CRC which is detected from the demodulated data (step S15). When it is determined that the reception of the packet is completed (Yes in step S15), the self-destined packet determination section 24 determines whether or not the received packet is a self-destined packet, by using the destination address which is detected from the demodulated data (step S16). In this case, the self-destined packet determination section 24 further outputs, to the transmission timing control section 30, the reception completion signal indicating that the reception of the packet is completed. When the received packet is determined as a self-destined packet (Yes in step S16), the self-destined packet processing section 25 subjects the self-destined packet to a predetermined process (step 317). The process steps of steps S14 to 317 described above are performed when the wireless station is used as the receiving station 13. On the other hand, when the received packet is determined as a non-self-destined packet (No in step S16), the process advances to step S18 shown in FIG. 8 through A. In this case, the non-self station corresponds to the receiving station 13, and therefore the process step of step S18 and the following steps are performed only when the wireless station is used as any of the relay stations 121 to 124. Accordingly, the process steps of steps S14 to S16 and S18 to S29 are performed when the wireless station is used as any of the relay stations 121 to 124.

In FIG. 8, the transmission timing control section 30 determines the criterion timing based on the reception completion signal outputted by the self-destined packet determination section 24 (step S18). Following step S18, the preamble selection section 26 selects, at random, one of a plurality of the PR lengths which are previously stored therein (step S19). Following step S19, the transmission packet processing section 27 replaces a preamble included in the transmission packet corresponding to a non-self-destined packet, with a preamble having the PR length selected in step S19, so as to generate a relay packet, and stores the generated relay packet (step S20). Following step S20, the symbol waveform/delay amount selection section 29 determines whether or not the PR length selected in step S19 is the longest PR length (step S21). When the PR length selected in step S20 is longest, the transmission start timing is earliest of those for the relay stations 121 to 124. That is, the relay station which selects the longest PR length transmits the relay packet earliest. Therefore, when the PR length is determined as being longest in step S21, the relay packet from a non-self relay station is not received, and therefore the symbol waveform/delay amount estimation section 28 does not estimate a symbol waveform and a delay amount which are selected by a non-self relay station. That is, the estimation result signal is not obtained from the symbol waveform/delay amount estimation section 28. Therefore, in this case, the symbol waveform/delay amount selection section 29 selects, at random, one of a plurality of combinations of the symbol waveform and the delay amount (step S22). On the other hand, when it is determined in step S21 that the PR length is not longest, a relay packet may be received from a non-self relay station, and therefore the symbol waveform/delay amount estimation section 28 estimates a symbol waveform and a delay amount selected by the non-self relay station. That is, the estimation result signal may be obtained from the symbol waveform/delay amount estimation section 28. Therefore, in this case, the process advances to step S23.

In step S23, the symbol waveform/delay amount estimation section 28 estimates a symbol waveform and a delay amount selected by the non-self relay station, based on the preamble, included in the received baseband signal, of the relay packet transmitted by the non-self relay station. Following step S23, the symbol waveform/delay amount estimation section 28 determines whether or not the estimation completion timing has come (step S24). When the estimation completion timing is determined as having come (Yes in step S24), the symbol waveform/delay amount estimation section 28 determines whether or not the estimation result is obtained (step S25). That is, the symbol waveform/delay amount estimation section 28 determines whether or not the estimation result signal can be generated (step S25). When the estimation result is obtained in step S25, the symbol waveform/delay amount selection section 29 selects, at random, one of the plurality of combinations other than the combination which is selected by the non-self relay station and is represented by the estimation result signal (step S26). When a plurality of combinations of the symbol waveform and the delay amount, other than the combination selected by the non-self relay station, are allowed to be selected, the symbol waveform/delay amount selection section 29 may select, at random, one of the plurality of combinations which are allowed to be selected. On the other hand, when the estimation result is not obtained in step S25, the process advances to step S22. In step S22, the symbol waveform/delay amount selection section 29 selects a combination of the symbol waveform and the delay amount at random.

Following steps S22 and S26, the transmission timing control section 30 determines the transmission start timing by using the criterion timing, the PR length selected in step S19, the delay amount selected in step S22 or S26, and the PR length which is shortest of a plurality of the PR lengths which are allowed to be selected by the preamble selection section 26 (step S27). Here, as described above, the transmission start timing is a timing which is earlier, by a difference between the PR length selected by the self station and the PR length which is shortest of the PR lengths which are allowed to be selected by the preamble selection section 26, than a timing delayed from the criterion timing by the selected delay amount. When the transmission start timing is determined as described above, it is possible to add the delay amount selected in step S22 or step S26 to data following the preamble. Following step S27, the transmission timing control section 30 determines whether or not the transmission start timing has come (step S28). When the transmission start timing is determined as having come in step S28, the modulation section 31 reads, from the transmission packet processing section 27, the relay packet stored in step S20, and modulates the relay packet by using the symbol waveform selected in step S22 or S26, so as to output a modulated baseband signal. The modulated baseband signal is frequency-converted to an RF band signal by the RF section 22, and then transmitted from the antenna 21 (step S29).

In steps described above, when the wireless station is used as the relay station, the relay station which selects the PR length which is longest of all the relay stations starts the transmission earliest, and then the transmission is started in descending order of the length starting from the relay station which selects the preamble which is the second longest of all the relay stations. Further, the delay amount which is allowed to be selected can be applied to data following the preamble by determining the transmission start timing. Thus, the path diversity effect can be obtained at the receiving station, thereby enabling demodulation of the received packet without error. Further, the relay station which selects the longest PR length transmits the relay packet earliest. Therefore, the relay stations which select the PR lengths other than the longest PR length are each allowed to estimate a combination of the symbol waveform and the delay amount selected by a non-self relay station, based on the preamble of the relay packet which is transmitted earlier by the non-self relay station. Thus, the relay stations which select the PR lengths, respectively, other than the longest PR length are each allowed to select a combination of the symbol waveform and the delay amount, which is different from the combination selected by a non-self relay station. As a result, the path diversity effect which is almost equivalent to the maximum number of effective branches is obtained.

Figure 9:
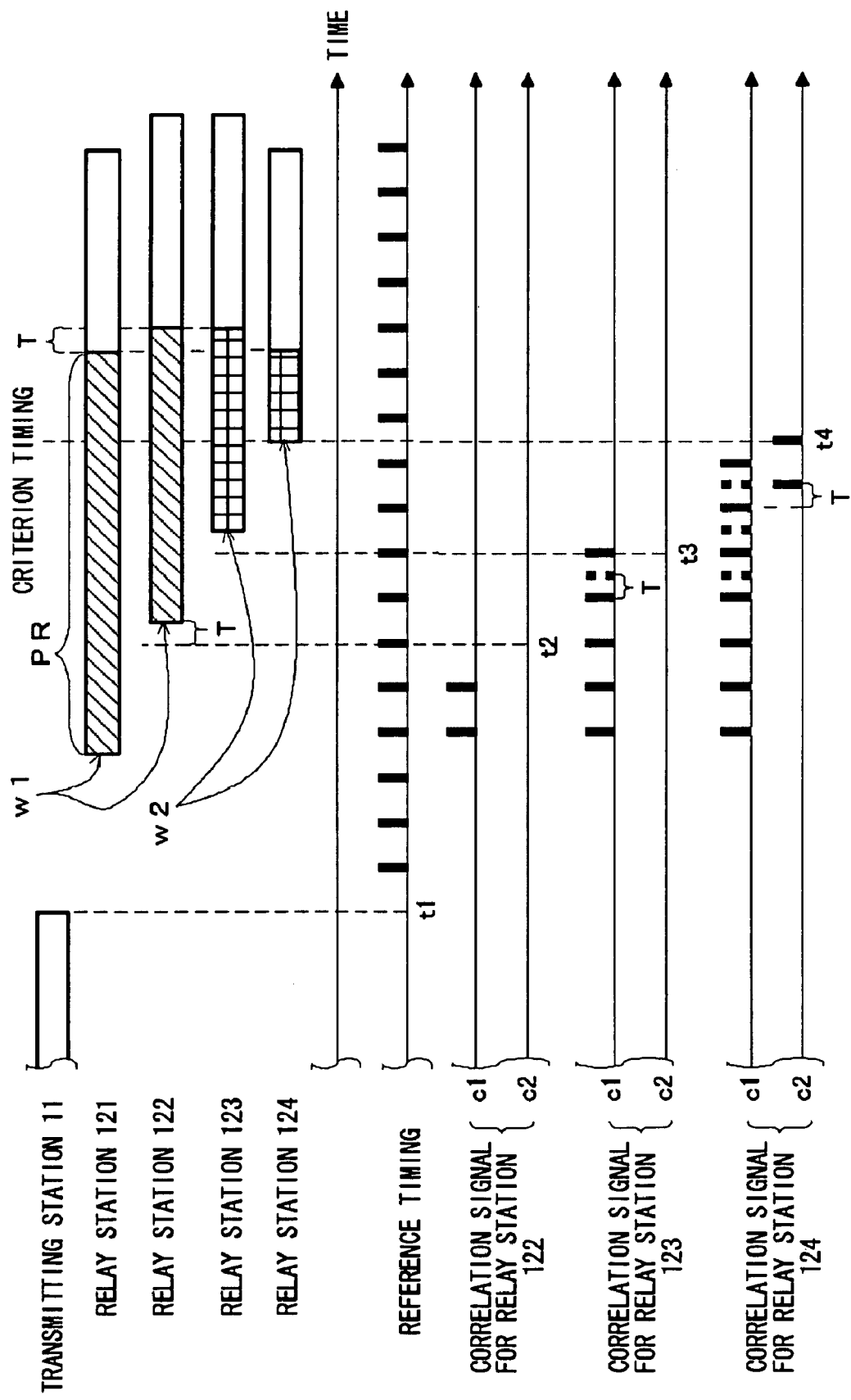
FIG. 9 is a diagram illustrating an outline of a process performed by relay station 121 to 124 according to the first embodiment.

Next, an exemplary process performed by the relay stations 121 to 124 according to the first embodiment will be described with reference to FIG. 9. FIG. 9 is a diagram illustrating an outline of the process performed by the relay stations 121 to 124 according to the first embodiment. FIG. 9 shows a timing at which the transmission packet is transmitted by the transmitting station 11, and timings at which the relay packets are to be transmitted by the relay stations 121 to 124, respectively, the reference timing used by each of the relay stations 121 to 124, and a correlation signal for each of the relay stations 122 to 124. In an example shown in FIG. 9, the relay station 121 selects the longest PR length (corresponding to the length of PR4 shown in FIG. 2). The relay station 122 selects the second longest PR length (corresponding to the length of PR3 shown in FIG. 2). The relay station 123 selects the third longest PR length (corresponding to the length of PR2 shown in FIG. 2). The relay station 124 selects the shortest PR length (corresponding to the length of PR1 shown in FIG. 2). Further, in the example shown in FIG. 9, one of combinations based on two types of symbol waveforms (w1, w2) and two amounts (0, T) of delay is selected as the transmission parameter. Here, the relay station 121 selects (the symbol waveform w1, the amount 0 of delay), the relay station 122 selects (the symbol waveform w1, the amount T of delay), the relay station 123 selects (the symbol waveform w2, the amount T of delay), and the relay station 124 selects (the symbol waveform w2, the amount 0 of delay). Further, in the example shown in FIG. 9, for simplifying the description, each preamble (PR) is hatched. The diagonal hatching indicates that the preamble is modulated by using the symbol waveform w1. The grid hatching indicates that the preamble is modulated by using the symbol waveform w2.

The timing at which the reception completion signal is inputted, the criterion timing, the estimation completion timing, the transmission start timing, and the reference timing, all of which are described above, will be described again using the example shown in FIG. 9. t1 shown in FIG. 9 represents a timing at which the reception completion signal is inputted, that is, a timing at which reception of the transmission packet transmitted from the transmitting station 11 is completed. Further, the criterion timing shown in FIG. 9 represents a timing at which a predetermined waiting time elapses from a timing (t1) at which the reception completion signal is inputted. Further, t2 shown in FIG. 9 represents the estimation completion timing for the relay station 122. t3 represents the estimation completion timing for the relay station 123. t4 represents the estimation completion timing for the relay station 124. For example, the estimation completion timing t2 is a timing which is earlier than the criterion timing by a time difference between the PR length selected by the relay station 122 and the PR length (the PR length for the relay station 124) which is shortest of the PR lengths which are allowed to be selected by the relay station 122. Further, for example, the estimation completion timing t4 is a timing which is earlier than the criterion timing by a time difference between the PR length selected by the relay station 124 and the PR length (the PR length for the relay station 124) which is shortest of the PR lengths which are allowed to be selected by the relay station 124. Therefore, the estimation completion timing t4 is equal to the criterion timing. Thus, the estimation completion timing depends on the selected PR length, and the shorter the selected PR length is, the later the estimation completion timing is.

Further, in FIG. 9, a time represented by the head of each of the relay packets corresponds to the transmission start timing. For example, the amount T of delay is applied to the relay packet of the relay station 122. In this case, the transmission start timing is a timing which is earlier, by a difference between the PR length selected by the relay station 122 and the PR length (the PR length for the relay station 124) which is shortest of the PR lengths which are allowed to be selected by the relay station 122, than a timing which is delayed from the criterion timing by the amount T of delay selected by the relay station 122. Therefore, the transmission start timing for the relay station 122 is a timing delayed, by the amount T of delay, from the estimation completion timing t2 shown in FIG. 9. Further, for example, the delay amount is 0 for the relay station 124, and therefore the delay amount is not applied to the relay packet of the relay station 124. In this case, the transmission start timing is equal to the criterion timing as shown in FIG. 9. Thus, the estimation completion timing is not later than the transmission start timing regardless of whether the delay amount is 0 or T. Therefore, the estimation of a symbol waveform and a delay amount is completed no later than the estimation completion timing, and therefore the transmission can be accurately performed by using the selected delay amount.

Further, the reference timing shown in FIG. 9 is a timing generated by a counter for making a count at intervals represented by the reference waveform R1 or R2 by using t1 as a trigger. The reference timing is generated in each of the relay stations 121 to 124. When the transmission times from the transmitting station 11 to the respective relay stations 121 to 124 are almost the same, the reference timings generated by the respective relay stations 121 to 124 are almost the same.

Next, the manner in which each of the relay stations 121 to 124 estimates the transmission parameter will be described using the example shown in FIG. 9. The transmission start timing for the relay station 121 which selects the longest PR length is earliest of the transmission start timings for all the relay stations 121 to 124, as shown in FIG. 9. That is, the relay station 121 transmits the relay packet earliest. Therefore, the relay station 121 is not allowed to receive the relay packets from the other relay stations 122 to 124, and therefore the correlation signal (not shown in FIG. 9) represents no peak. As a result, the relay station 121 is not able to estimate a symbol waveform and a delay amount selected by the other relay stations 122 to 124. Therefore, the relay station 121 selects, at random, one of a plurality of combinations of the symbol waveform and the delay amount. In FIG. 9, the relay station 121 selects (the symbol waveform w1, the amount 0 of delay).

The relay station 122 receives the preamble transmitted by the relay station 121. The relay station 122 estimates the combination of the symbol waveform and the delay amount based on the preamble received from the relay station 121. The relay station 122 performs the estimation during a period from t1 to the estimation completion timing t2.

Initially, the estimation of a symbol waveform performed by the relay station 122 will be described. In the relay station 122, the correlation signal c1 shown in FIG. 9 is a signal representing a peak for the preamble obtained through modulation using the symbol waveform w1. In the relay station 122, the correlation signal c2 is a signal representing a peak for the preamble obtained through modulation using the symbol waveform w2. Further, the preamble transmitted by the relay station 121 is obtained through modulation using the symbol waveform w1. Here, the correlation signal c1 only represents the peak in the relay station 122. Therefore, the relay station 122 may estimate that the relay station 121 has selected the symbol waveform w1.

A method for estimating a delay amount will be described in detail. Timing intervals at which peaks appear in the correlation signal (c1 and c2) are the same as the intervals represented by the reference waveform R1 or R2. In general, one interval represented by the reference waveform R1 or R2 is longer than the delay amount which is allowed to be selected as the transmission parameter. Therefore, an interval between the peaks appearing in the correlation signal is longer than the delay amount which is allowed to be selected as the transmission parameter. For example, when the DSSS scheme is used as the modulation and demodulation scheme, the delay amount which is allowed to be selected as the transmission parameter represents a length which is longer than or equal to one chip of the spread code and is shorter than the spread code length. On the other hand, one interval represented by the reference waveform R1 or R2 typically represents one spread code length (one symbol length) or more. The intervals represented by the reference waveform R1 or R2 are the same as the timing intervals at which the peaks appear in the correlation signal. Therefore, an interval of timing of the peaks appearing in the correlation signal represents one spread code length (one symbol length) or more, and is longer than the delay amount which is allowed to be selected as the transmission parameter. As a result, for example, a time difference between a timing at which the peak appears in the case of the transmitted relay packet having an amount 0 of delay being received, and a timing at which the peak appears in the case of the transmitted packet having the amount T of delay being received, is not larger than each of the intervals at which the peaks appear. Therefore, it may be estimated that a time difference between the respective timings represents the amount T of delay. A timing, for calculating the delay amount, is necessary when the number of the amounts of delay represented by the peaks appearing in the correlation signal is one. Therefore, the reference timing is used in the example shown in FIG. 9. Further, the reference timing shown in FIG. 9 is set so as to represent the same phase as the peak appearing in the correlation signal obtained when the transmitted relay packet having the amount 0 of delay is received. Therefore, in the example shown in FIG. 9, when the delay amount is 0, the peak appears in the correlation signal at the reference timing. On the other hand, when the delay amount is T, a time difference between one of the timings at which the peaks appear in the correlation signal, and the reference timing immediately preceding the one of the timings at which the peaks appear in the correlation signal, represents T. Further, in the example shown in FIG. 9, one interval of the reference timing is determined so as to be twice the maximum delay amount (in this case, T) which is allowed to be selected as the transmission parameter. Thus, even when a timing at which the peak appears in the correlation signal is changed due to jitter of a clock, or the like, the delay amount can be accurately estimated.

The relay station 122 estimates the delay amount based on the correlation signals c1 and c2 in the estimation method described above. In the relay station 122, the timings at which the peaks appear in the correlation signal c1 represent the same phase as represented by the reference timing. Therefore, the relay station 122 is able to estimate that the delay amount selected by the relay station 121 is 0. As described above, the relay station 122 is allowed to estimate that the combination selected by the relay station 121 is (the symbol waveform w1, the amount 0 of delay). The relay station 122 selects, at random, one of the combinations other than the combination selected by the relay station 121. In the example shown in FIG. 9, the relay station 122 selects (the symbol waveform w1, the amount T of delay).

The relay station 123 receives the preambles transmitted from the relay stations 121 and 122, respectively. The relay station 123 estimates the combinations of the symbol waveform and the delay amount based on the received preambles transmitted from the relay stations 121 and 122, respectively. The relay station 123 performs the estimation during a period from t1 to the estimation completion timing t3. In FIG. 9, the relay station 123 detects the peak in only the correlation signal c1. Thus, the relay station 123 estimates that the symbol waveform selected by each of the relay stations 121 and 122 is w1. Further, in the relay station 123, the peak (solid line) appearing in the correlation signal c1 represents the same phase as represented by the reference timing. Thus, the relay station 123 is able to estimate that the amount 0 of delay is selected. Further, in the relay station 123, the peak (dotted line) appears in the correlation signal c1 at a timing delayed by T from the reference timing. Therefore, the relay station 123 is able to estimate that the amount T of delay is selected. Accordingly, the relay station 123 is able to estimate that the combinations selected by the relay stations 121 and 122 are (the symbol waveform w1, the amount 0 of delay) and (the symbol waveform w1, the amount T of delay). The relay station 123 selects, at random, one of the combinations other than the estimated combinations. In the example shown in FIG. 9, the relay station 123 selects (the symbol waveform w2, the amount T of delay).

The relay station 124 receives the preambles transmitted by the relay stations 121 to 123, respectively. The relay station 124 estimates the combinations of the symbol waveform and the delay amount based on the preambles received from the relay stations 121 to 123, respectively. The relay station 124 performs the estimation during a period from t1 to the estimation completion timing t4. In FIG. 9, the relay station 124 detects the peak in each of the correlation signals c1 and c2. Thus, the relay station 124 estimates that the symbol waveforms selected by the relay stations 121 to 123 are w1 and w2. Further, in the relay station 124, the peak (solid line) appearing in the correlation signal c1 represents the same phase as represented by the reference timing. Thus, the relay station 124 is able to estimate that the amount 0 of delay is selected for the symbol waveform w1. Further, in the relay station 124, the peak (dotted line) appearing in the correlation signal c1 is delayed by T from the reference timing. Therefore, the relay station 124 is able to estimate that the amount T of delay is selected for the symbol waveform w1. Further, in the relay station 124, the peak (solid line) appearing in the correlation signal c2 is delayed by T from the reference timing. Therefore, the relay station 124 is able to estimate that the amount T of delay is selected for the symbol waveform w2. Thus, the relay station 124 is able to estimate that the combinations selected by the relay stations 121 to 123 are (the symbol waveform w1, the amount 0 of delay), (the symbol waveform w1, the amount T of delay), and (the symbol waveform w2, the amount T of delay). The relay station 124 selects a combination (the symbol waveform w2, the amount 0 of delay) which is different from the estimated combinations.

As described above, when the relay stations 121 to 124 select the preambles, respectively, which are different from each other, the relay stations 121 to 124 are able to select the combinations thereof, respectively, which are different from each other. Therefore, the four branch path diversity effect can be securely obtained. The assumption that the preamble selected by the relay station 123 and the preamble selected by the relay station 124 has the same length (for example, the shortest preamble is selected), will be described with reference to FIG. 9. In this case, the relay station 123 and the relay station 124 each estimates the combinations selected by the relay station 121 and the relay station 122. Further, each of the relay station 123 and the relay station 124 selects, at random, a combination which is different from the estimated combinations. Therefore, even when the preamble selected by the relay station 123 and the preamble selected by the relay station 124 have the same length, four branch path diversity effect is likely to be obtained.

Although in the example shown in FIG. 9 the delay amount is estimated by using the reference timing, the present invention is not limited thereto. It is possible to estimate whether the delay amount is 0 or T, by measuring a time difference between a timing t1 at which the reception of a packet from the transmitting station is completed, and a timing at which the peak appears in the correlation signal. For example, the time difference between t1 and the timing at which the peak appears in the correlation signal is divided by an interval of timing of the peaks appearing in the correlation signal. An undivided part (remainder) of the result of the division represents a value based on the delay amount. Therefore, it is possible to estimate the delay amount by obtaining the remainder.

Further, although in the example shown in FIG. 9 the reference timing represents the same phase as the correlation signal representing the amount 0 of delay, the present invention is not limited thereto. When a relationship in phase between the reference timing and the timing at which the peak appears in the correlation signal is previously obtained for each delay amount, the reference timing may not necessarily represent the same phase as the correlation signal representing the amount 0 of delay.

Next, a calculation result of a probability with which the path diversity effect is obtained will be described with reference to FIG. 10. In FIG. 10, selection patterns in which the relay stations 121 to 124 select the PR lengths, respectively, are classified into eight as indicated in the leftmost column. In column (a), indicated are the probabilities with which the patterns (1) to (8), respectively, are obtained. In columns (b) to (e), the probabilities with which 1 to 4 branch path diversity effects, respectively, are obtained are indicated for each of the patterns (1) to (8). The average probabilities indicated in the bottom line are obtained by multiplying the probabilities in column (a) by the probabilities in columns (b) to (e), respectively, so as to calculate averages. Further, in FIG. 10, for example, when the maximum number of effective branches is four (for example, the maximum number of effective branches obtained when selection is made based on two symbol waveforms and two amounts of delay), the number of the PR lengths is four, and the number of the relay stations is four, the probability with which the path diversity effect is obtained is calculated.

(1) represents a pattern in which all the relay stations 121 to 124 select the same PR length. The number of types of the pattern in which the four stations select the same PR length is four. Further, in the case of (1), the PR length is the same there among, and therefore the relay stations 121 to 124 simultaneously transmit the relay packets, respectively. Therefore, each of the relay stations 121 to 124 is not able to estimate the transmission parameter, and therefore determines the combination of the transmission parameter at random. Therefore, the number of patterns of the combinations selectable as the transmission parameter is $4^4$ (256). Therefore, the probability of (1) is 4/256 (=1/64) as indicated in column (a) of (1). Further, in the case of (1), the probability of one branch of (b) is 1/64, the probability of two branches of (c) is 21/64, the probability of three branches of (d) is 9/16, and the probability of four branches of (e) is 3/32. For example, in the case of (b), the number of types of the pattern in which the relay stations 121 to 124 select one type of combination of the transmission parameter is one, and the number of the transmission parameters is four. Therefore, the probability of one branch of (b) is 4/256 (=1/64). Further, in the case of (c), the number of types of the pattern in which the relay stations 121 to 124 select two types of the transmission parameters is fourteen in total. Therefore, the probability of two branches of (c) is 6×14/256=21/64.

(2) represents a pattern in which three stations, among the relay stations 121 to 124, select the same PR length (long PR), and the remaining one station selects the PR length (short PR)

which is shorter than the long PR length. The probability of (2) is 3/32 as indicated in column (a) of (2). In the case of (2), the one station which selects the short PR is allowed to estimate the transmission parameter selected by each of the other three stations, and therefore two or more branch path diversity effects can be securely obtained. Therefore, the probability of one branch of (b) is 0, the probability of two branches of (c) is 1/64, the probability of three branches of (d) is 9/16, and the probability of four branches of (e) is 3/8.

(3) represents a pattern in which two stations, among the relay stations 121 to 124, select the same PR length (long PR), and the remaining two stations select the PR length (short PR) which is shorter than the long PR length. The probability of (3) is 9/64 as indicated in column (a) of (3). In the case of (3), the two stations which select the short PR are able to estimate the transmission parameters selected by the other two stations, and therefore, two or more branch path diversity effects can be securely obtained. Therefore, the probability of one branch of (b) is 0, the probability of two branches of (c) is 1/12, the probability of three branches of (d) is 13/24, and the probability of four branches of (e) is 3/8.

(4) represents a pattern in which one station, among the relay stations 121 to 124, selects the PR length (long PR), and the remaining three stations select the PR length (short PR) which is shorter than the long PR length. The probability of (4) is 3/32 as indicated in column (a) of (4). In the case of (4), the three stations which select the short PR are able to estimate the transmission parameter selected by the other one station, and therefore two or more branch path diversity effects can be securely obtained. Therefore, the probability of one branch of (b) is 0, the probability of two branches of (c) is 1/9, the probability of three branches of (d) is 2/3, and the probability of four branches of (e) is 2/9.

(5) represents a pattern in which two stations, among the relay stations 121 to 124, select the same PR length (long PR), another one station selects the PR length (medium PR) which is shorter than the long PR length, and the remaining one station selects the PR length (short PR) which is shorter than the medium PR length. The probability of (5) is 3/16 as indicated in column (a) of (5). In the case of (5), the one station which selects the medium PR is able to estimate the transmission parameters of the two stations which select the long PR. Further, the one station which selects the short PR is able to estimate the transmission parameters of the two stations which select the long PR, and the transmission parameter of the one station which selects the medium PR. Thus, in the case of (5), three or more branch path diversity effects can be securely obtained. Therefore, the probability of one branch of (b) is 0, the probability of two branches of (c) is 0, the probability of three branches of (d) is 1/4, and the probability of four branches of (e) is 3/4.

(6) represents a pattern in which one station, among the relay stations 121 to 124, selects the PR length (long PR), the other two stations select the PR length (medium PR) which is shorter than the long PR length, and the remaining one station selects the PR length (short PR) which is shorter than the medium PR length. The probability of (6) is 3/16 as indicated in column (a) of (6). Further, in the case of (6), the probability of one branch of (b) is 0, the probability of two branches of (c) is 0, the probability of three branches of (d) is 1/3, and the probability of four branches of (e) is 2/3. Further, (7) represents a pattern in which one station, among the relay stations 121 to 124, selects the PR length (long PR), another one station selects the PR length (medium PR) which is shorter than the long PR length, and the remaining two stations select the PR length (short PR) which is shorter than the medium PR length. The probability of (7) is 3/16 as indicated in column (a) of (7). Further, in the case of (7), the probability of one branch of (b) is 0, the probability of two branches of (c) is 0, the probability of three branches of (d) is 1/2, and the probability of four branches of (e) is 1/2. Further, (8) represents a pattern in which the relay stations 121 to 124 select the PR lengths, respectively, which are different from each other. The probability of (8) is 3/32 as indicated in column (a) of (8). In the case of (8), the relay stations 121 to 124 select the PR lengths, respectively, which are different from each other, and therefore four or more branch path diversity effects can be securely obtained.

Further, as indicated in the average probability shown in FIG. 10, for example, the probability with which the path diversity effect of four branches corresponding to the maximum number of effective branches is obtained is "3461/6144=0.5633 . . . ". That is, it is understood that the path diversity effect equivalent to the maximum number of effective branches can be obtained with the probability of 50 or more percents. Further, the probability with which two or more branch path diversity effect is obtained is "407/12288+413/1024+3461/6144=0.9997 . . . ", which means that the probability is high. Therefore, in the wireless transmission system 1 according to the present embodiment, it is possible to almost perfectly obtain two or more branch path diversity effects.

As described above, in the present embodiment, the process is performed such that the relay stations 121 to 124 select the PR lengths, respectively, which are different from each other. Thus, for example, when the PR length selected by the relay station 121 is longer than the PR length selected by the relay station 122, the relay station 122 is able to receive the relay packet from the relay station 121 before the relay station 122 transmits the relay packet. The relay station 122 estimates a combination of the symbol waveform and the delay amount, which is selected by the relay station 121, based on the preamble of the relay packet transmitted from the relay station 121, so as to select a combination thereof which is different from the estimated combination. Thus, according to the present embodiment, it is possible to enhance the probability with which the relay stations 121 to 124 transmit the relay packets by using the combinations, respectively, of the symbol waveform and the delay amount, which are different from each other. As a result, at the receiving station 13, the path diversity effect can be obtained. Further, according to the present embodiment, it is possible to enhance the possibility that the path diversity effect equivalent to the maximum number of effective branches is obtained, and to maximize the path diversity effect exerted by the wireless transmission system 1.

Although in the above description the preamble selection section 26 selects the PR length from among predetermined four lengths (lengths of the preambles PR1, PR2, PR3, and PR4), as shown in FIG. 2, the number of the PR lengths is not limited to four. The number of the PR lengths may be smaller than or equal to three, or may be greater than or equal to five. When the relay stations 121 to 124 are each allowed to select the PR length from among the increased number of the PR lengths which are different from each other, the probability with which the relay stations 121 to 124 select the PR lengths, respectively, which are different from each other, is enhanced. Thus, the probability with which the transmission parameter which is different from the transmission parameter selected by another relay station is selected is enhanced, and therefore the possibility that the path diversity effect equivalent to the maximum number of effective branches is obtained is enhanced. Further, when the PR length to be selected by the preamble selection section 26 is extremely long, the preamble portion other than the information data is increased, thereby deteriorating the transmission efficiency. Therefore, the upper limit value of the PR length may be set so as to represent an appropriate length. Further, the preamble selection section 26 may select, at random, the PR length within a predetermined range. For example, when the minimum PR length is 32 symbol length, and the maximum PR length is 64 symbol length, the preamble selection section 26 may select any PR length (any of PR length 32, 33, 34 to 63, 64) in increments of symbol length.

In the above description, the number of types of the data sequence of the preamble is one. Therefore, in the above description, one type of the data sequence of the preamble is modulated by using two types of the symbol waveforms, w1 and w2, thereby obtaining two types of preamble waveforms. Specifically, the number of types of the symbol waveform corresponds to the number of types of preamble waveform in a one-to-one manner. On the other hand, the number of types of the transmission parameter may correspond to the number of types of preamble waveform in a one-to-one manner. Specifically, although in the above description, for example, the number of the types of the transmission parameter is four ((the symbol waveform w1, the amount 0 of delay), (the symbol waveform w1, the amount T of delay), (the symbol waveform w2, the amount 0 of delay), (the symbol waveform w2, the amount T of delay)), the transmission parameters may correspond to four types of preamble waveforms. In order to obtain four types of preamble waveforms, two methods may be used, that is, a method in which the number of types of the data sequence of the preamble is one, and the number of types of the symbol waveform is four, and a method in which the number of types of the data sequence of the preamble is two, and the number of types of the symbol waveform is two. For example, two types of the data sequences, "1010 . . . " and "1100 . . . ", of the preamble are used, and each data sequence is modulated by using the symbol waveforms w1 and w2. Thus, four types of preamble waveforms, different from each other, may be generated. Here, the four types of preamble waveforms are represented as preamble waveforms pwA, pwB, pwC, and pwD. Further, the preamble waveforms pwA and pwB are based on the symbol waveform w1, and the preamble waveforms pwC and pwD are based on the symbol waveform w2. When the number of types of data sequence of the preamble is two, the preamble selection section 26 may select not only the PR length but also the data sequence of the preamble. At this time, the transmission packet processing section 27 replaces the data sequence of the preamble included in the transmission packet corresponding to a non-self destined packet, with the preamble having the data sequence selected by the preamble selection section 26.

The four types of the preamble waveforms pwA, pwB, pwC, and pwD, obtained as above, are associated with four types of transmission parameters (the symbol waveform w1 the amount 0 of delay), (the symbol waveform w1, the amount T of delay), (the symbol waveform w2, the amount 0 of delay), (the symbol waveform w2, the amount T of delay) in a one-to-one manner. For example, when (the symbol waveform w1, the amount 0 of delay) is selected as the transmission parameter, the preamble having the preamble waveform pwA is used so as to generate a packet, and data is modulated by using the symbol waveform w1 for the portion following the preamble.

Figure 11:
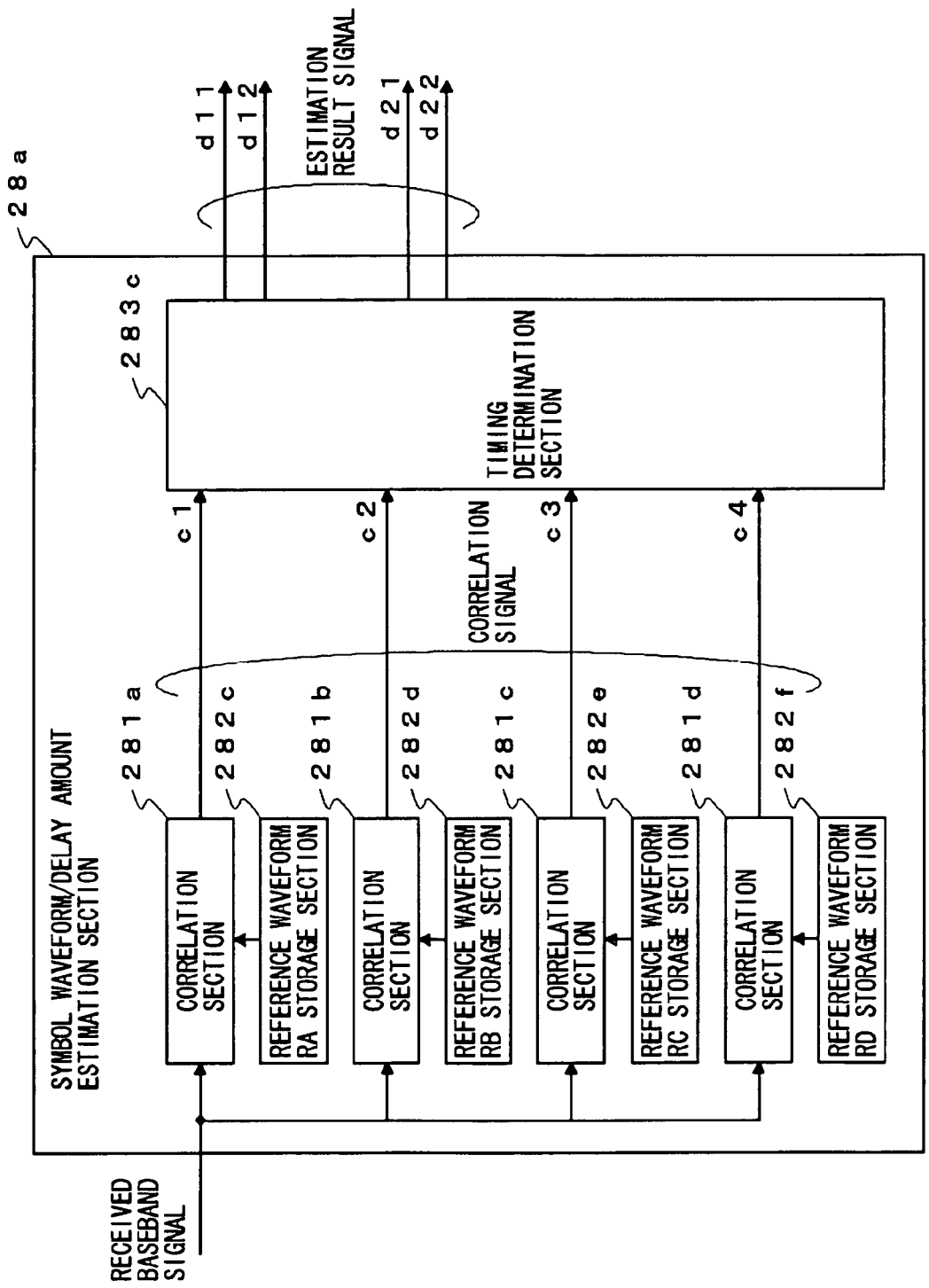
FIG. 11 is a block diagram illustrating a configuration of a symbol waveform/delay amount estimation section 28a used when a transmission parameter corresponds to a preamble waveform in a one-to-one manner.

When the transmission parameter corresponds to the preamble waveform in a one-to-one manner, the configuration of the symbol waveform/delay amount estimation section 28 shown in FIG. 4 is replaced with a configuration of the symbol waveform/delay amount estimation section 28a shown in FIG. 11. FIG. 11 is a block diagram illustrating a configuration of the symbol waveform/delay amount estimation section 28a used when the transmission parameter corresponds to the preamble waveform in a one-to-one manner. In FIG. 11, the symbol waveform/delay amount estimation section 28a includes: correlation sections 281a, 281b, 281c, and 281d; a reference waveform RA storage section 282c; a reference waveform RB storage section 282d; a reference waveform RC storage section 282e; a reference waveform RD storage section 282f; and the timing determination section 283c. The functions of the correlation sections 281a, 281b, 281c, and 281d are each the same as the function of the correlation sections 281a or 281b shown in FIG. 4. The reference waveform RA storage section 282c stores waveform data of the preamble waveform pwA as a reference waveform RA. The reference waveform RB storage section 282d stores waveform data of the preamble waveform pwB as a reference waveform RB. The reference waveform RC storage section 282e stores waveform data of the preamble waveform pwC as a reference waveform RC. The reference waveform RD storage section 282f stores waveform data of the preamble waveform pwD as a reference waveform RD. The timing determination section 283c outputs the estimation result signal based on the correlation signals c1 to c4 outputted by the correlation sections 281a, 281b, 281c, and 281d, respectively. It is possible to determine the transmission parameter selected by a non-self relay station based on whether or not the peak appears in each of the correlation signals c1 to c4.

As described above, when the symbol waveform of the transmission parameter corresponds to the preamble waveform in a one-to-one manner, the symbol waveform and the delay amount are estimated substantially based on whether or not each of the two correlation signals c1 and c2 represents the peak, and timings at which the peaks appear in the correlation signals c1 and c2, respectively. On the other hand, when the transmission parameter corresponds to the preamble waveform in the one-to-one manner, the symbol waveform and the delay amount may be estimated only based on whether or not each of the four correlation signals c1 to c4 represents the peak. Thus, the estimation accuracy can be enhanced as compared to a case where the estimation is performed by using two correlation signals c1 and c2.

SECOND EMBODIMENT

Hereinafter, a wireless transmission system 2 according to a second embodiment of the present invention will be described. In the first embodiment, after the transmitting station 11 initially transmits a transmission packet, only the relay stations 121 to 124 transmit relay packets, respectively. On the other hand, in the present embodiment, when the relay stations 121 to 124 transmit the relay packets, respectively, the transmitting station 11 also transmits a relay packet. The transmitting station according to the present embodiment is denoted by a reference numeral 11a so as to be distinguished from the transmitting station 11 according to the first embodiment.

Figure 12:
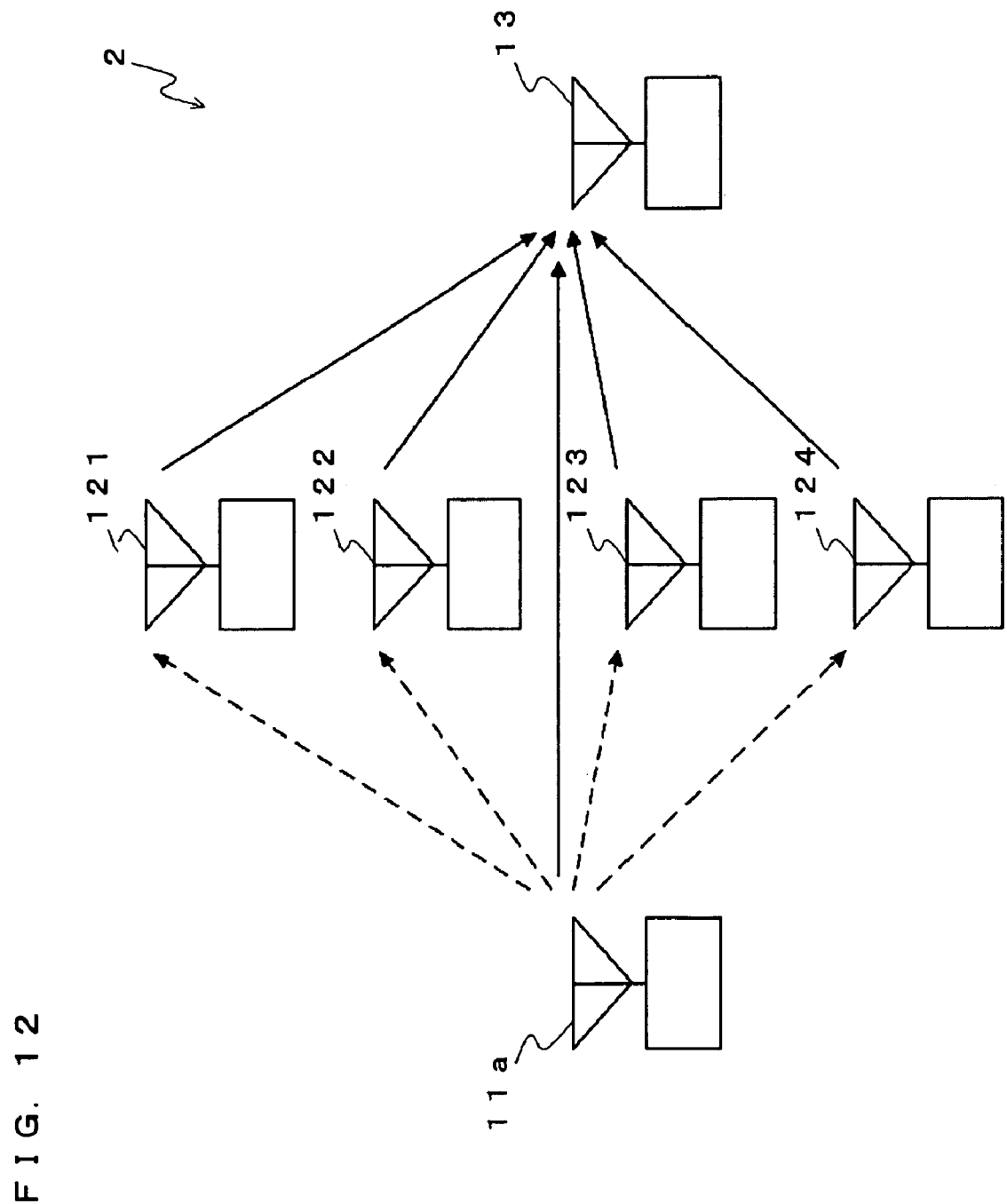
FIG. 12 is a diagram illustrating a configuration of a wireless transmission system 2 according to a second embodiment.

FIG. 12 is a diagram illustrating a configuration of the wireless transmission system 2 according to the second embodiment. The configuration of the wireless transmission system 2 shown in FIG. 12 is different from the configuration shown in FIG. 1 in that the transmitting station 11a is used instead of the transmitting station 11 in the wireless transmission system 2 shown in FIG. 12. The components other than the transmitting station, which are the same as shown in FIG. 1, are denoted by the same reference numerals as used in FIG. 1, and the description thereof is not given. In FIG. 12, dotted line arrows indicate that a transmission packet transmitted by the transmitting station 11a for the first time is received by each of the relay stations 121 to 124. Further, solid line arrows indicate that each of the relay stations 121 to 124 transmits a relay packet, and the transmitting station 11a also transmits a relay packet. That is, the transmitting station 11a performs transmission process twice, that is, a process of transmitting the transmission packet, and a process of transmitting the relay packet.

The transmitting station 11a transmits the transmission packet, and thereafter calculates a criterion timing for transmitting the relay packet. The criterion timing is obtained by adding, to a timing at which the transmission packet has been transmitted, a predetermined waiting time and a time necessary for transmission from the transmitting station 11a to each of the relay stations 121 to 124. In the present embodiment, a time necessary for transmission between the transmitting station 11a and each of the relay stations 121 to 124 is short enough to be neglected. Therefore, the transmitting station 11a calculates, as the criterion timing, a timing at which the predetermined waiting time elapses from a timing at which the transmission packet has been transmitted. The predetermined waiting time is equal to a predetermined time which is necessary for each of the relay stations 121 to 124 to determine the criterion timing. When the transmitting station 11a transmits the relay packet, the transmitting station 11a selects one of a plurality of PR lengths at random as each of the relay stations 121 to 124 does. The transmitting station 11a estimates a combination of a symbol waveform and a delay amount, which is selected by each of the relay stations 121 to 124, based on the relay packet transmitted by each of the relay stations 121 to 124. The transmitting station 11a selects a combination of a symbol waveform and a delay amount other than the combination thereof having been estimated.

Figure 13:
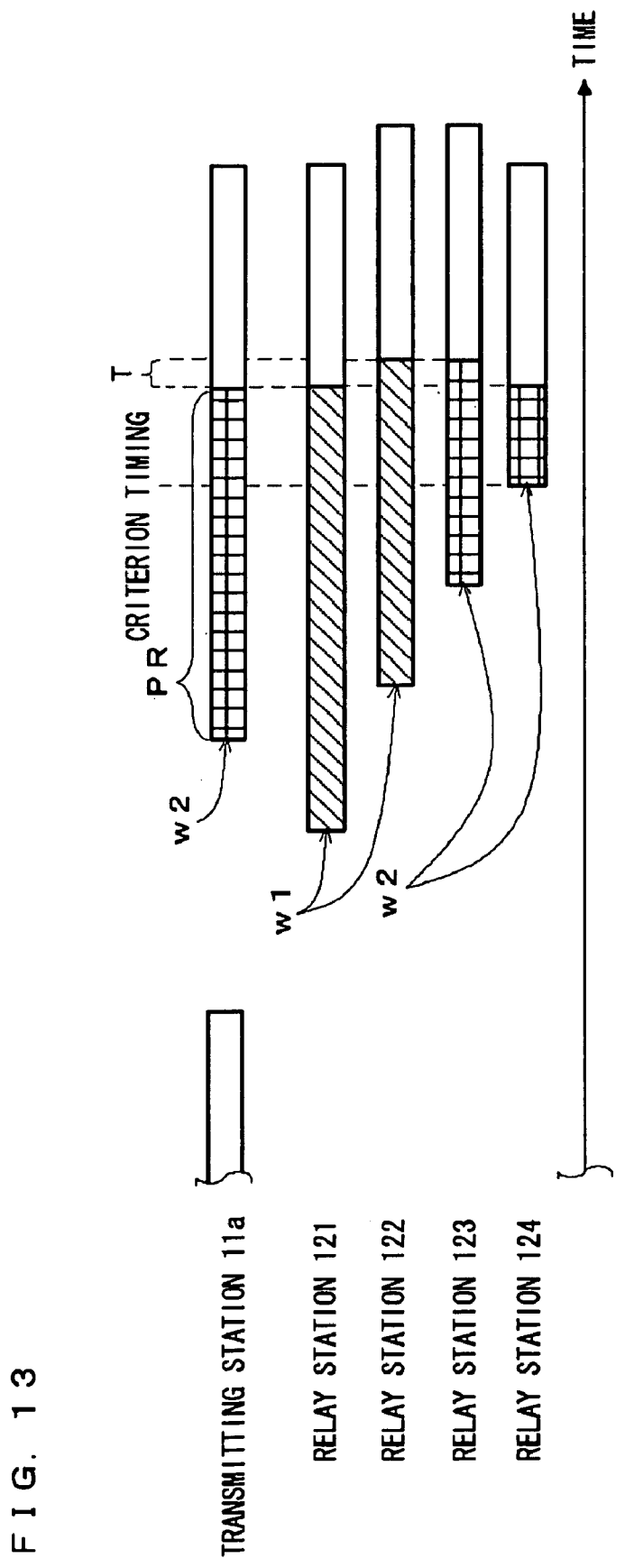
FIG. 13 is a diagram illustrating an outline of process performed by a transmitting station 11a and the relay stations 121 to 124 according to the second embodiment.

FIG. 13 is a diagram illustrating an outline of process performed by the transmitting station 11a and the relay stations 121 to 124 according to the second embodiment. The outline of the process shown in FIG. 13 is different from the outline of the process shown in FIG. 9 only in that, in FIG. 13, the transmitting station 11a transmits a relay packet, and the reference timing and the respective correlation signals are not shown. Therefore, the process performed the relay stations 121 to 124 is not described. In FIG. 13, the transmitting station 11a selects the second longest preamble length. Therefore, the transmitting station 11a estimates a combination of a symbol waveform and a delay amount, which is selected by the relay station 121, by using the preamble (PR) portion of the relay packet transmitted by the relay station 121. The transmitting station 11a selects a combination (in FIG. 13, the symbol waveform w2, the amount 0 of delay) of a symbol waveform and a delay amount, which is different from the combination thereof selected by the relay station 121, and generates a relay packet based on the selected combination. The transmitting station 11a transmits the generated relay packet at a retransmission start timing which is determined by the transmitting station 11a itself. A method for determining the retransmission start timing is similar to the method in which each of the relay stations 121 to 124 determines the transmission start timing.

As described above, according to the present embodiment, when the relay stations 121 to 124 transmit relay packets, respectively, the transmitting station 11a also transmits a relay packet. Thus, the number of wireless stations for transmitting the relay packets is increased, thereby obtaining the path diversity effect with enhanced probability.

In FIG. 13, the relay station 124 selects the shortest preamble length. Therefore, the relay station 124 estimates the combination of the symbol waveform and the delay amount, which is selected by each of the transmitting station 11a and the relay stations 121 to 123. At this time, as shown in FIG. 13, all the combinations of the symbol waveform and the delay amount are selected by the transmitting station 11a and the relay stations 121 to 123. Therefore, the relay station 124 recognizes, in the estimation process, that all the combinations of the symbol waveform and the delay amount have been selected. At this time, the relay station 124 may select one of the combinations of the symbol waveform and the delay amount at random. Alternatively, when the relay station 124 recognizes that all the combinations of the symbol waveform and the delay amount have been selected, the relay station 124 may transmit no relay packet. In this case, specifically, when each of the plurality of combinations previously stored in the symbol waveform/delay amount selection section 29 corresponds to any one of the combinations estimated by the symbol waveform/delay amount estimation section 28, the symbol waveform/delay amount selection section 29 of the relay station 124 stops the selection process. At this time, the symbol waveform/delay amount selection section 29 outputs a selection stop signal to the modulation section 31. When the selection stop signal is inputted, the modulation section 31 operates so as not to perform modulation process even when the transmission start signal is inputted from the transmission timing control section 30. The relay packets transmitted by four stations, that is, by the transmitting station 11a and the relay stations 121 to 123, enable achievement of the path diversity effect equivalent to the maximum number (=4) of effective branches, and therefore, even when the relay station 124 transmits no relay packet, the path diversity effect are not substantially influenced. However, when the relay station 124 transmits a relay packet, the reception power is increased at the receiving station 13. Therefore, when the relay station 124 transmits a relay packet, an effect that the increase of the reception power leads to improvement of the transmission characteristic is obtained. On the other hand, when the relay station 124 stops transmitting a relay packet, an effect that power consumption of the relay station 124 can be reduced is obtained.

THIRD EMBODIMENT

Hereinafter, a wireless transmission system 3 according to a third embodiment of the present invention will be described. In the second embodiment, the transmitting station 11a transmits a transmission packet and a relay packet. On the other hand, according to the present embodiment, when the transmitting station 11a transmits a relay packet, the transmitting station 11a selects a combination of a symbol waveform and a delay amount such that the combination thereof is different from combinations of the symbol waveform and the delay amount, which are allowed to be selected by the relay stations 121 to 124, thereby transmitting the relay packet. A configuration of the wireless transmission system 3 according to the present embodiment is the same as that for the second embodiment, and therefore FIG. 12 is used also for the third embodiment. The operations performed by the respective relay stations 121 to 124 and the receiving station 13 are the same as described for the first embodiment, and therefore the description thereof is not given.

The transmitting station 11a transmits a transmission packet, and thereafter transmits a relay packet at the retransmission start timing. The retransmission start timing is a timing which is delayed from the criterion timing by the selected delay amount. At this time, the transmitting station 11*a* selects a combination of a symbol waveform and a delay amount such that the combination thereof is different from the combinations of the symbol waveform and the delay amount, which are allowed to be selected by the relay stations 121 to 124, and generates a relay packet based on the selected combination. The transmitting station 11*a* transmits the generated relay packet at the retransmission start timing determined by the transmitting station 11*a* itself.

An exemplary case where two types of symbol waveforms w1 and w2, and two amounts 0 and T of delay are used to generate the combination of the symbol waveform and the delay amount will be described. For example, the combination of the symbol waveform and the delay amount, which is allowed to be selected by the transmitting station 11*a*, is set to the combination of the symbol waveform w1 and the amount 0 of delay. On the other hand, the combinations of the symbol waveform and the delay amount, which are allowed to be selected by the relay stations 121 to 124, are set to three types of combinations thereof, i.e., the symbol waveform w1 and the amount T of delay, the symbol waveform w2 and the amount 0 of delay, and the symbol waveform w2 and the amount T of delay. That is, the transmitting station 11*a* selects the combination of the symbol waveform w1 and the amount 0 of delay, and at least one of the three combinations, i.e., the symbol waveform w1 and the amount T of delay, the symbol waveform w2 and the amount 0 of delay, and the symbol waveform w2 and the amount T of delay, is selected by the relay stations 121 to 124. Therefore, according to the present embodiment, two branch path diversity effect can be securely obtained. In this case, the transmitting station 11*a* uses a predetermined combination (the symbol waveform w1 and the amount 0 of delay) to transmit a relay packet to the receiving station 13. Specifically, in this case, it is unnecessary for the transmitting station 11*a* to estimate the combinations selected by the relay stations 121 to 124. Further, it is unnecessary for the transmitting station 11*a* to transmit the relay packet by using a long preamble. This is because it is unnecessary to cause the relay stations 121 to 124 to estimate the combination of the symbol waveform and the delay amount, which is selected by the transmitting station 11*a*. Therefore, the transmitting station 11*a* may select the shortest PR length. In this case, the relay packet is transmitted from the transmitting station 11*a* at a timing later than any of timings at which the relay packets are transmitted from the relay stations 121 to 124. Thus, influence on the estimation of the transmission parameter, performed by each of the relay stations 121 to 124, can be reduced.

As described above, according to the present embodiment, a combination of a symbol waveform and a delay amount, which is allowed to be selected by the transmitting station 11*a* when the transmitting station 11*a* transmits a relay packet, is previously set so as to be different from combinations of a symbol waveform and a delay amount, which are allowed to be selected by the relay stations 121 to 124. Thus, according to the present embodiment, it is possible to securely obtain two branch path diversity effect. Further, when the number of combinations of a symbol waveform and a delay amount, the combinations being allowed to be selected by the transmitting station 11*a*, is limited to one, the relay stations 121 to 124 are allowed to select the increased number of transmission parameters. Thus, it is possible to increasingly enhance the probability with which the path diversity effect can be obtained.

Although an exemplary case where the transmitting station 11*a* selects one predetermined combination is described above, the present invention is not limited thereto. For example, the combination of the symbol waveform and the delay amount, which is allowed to be selected by the transmitting station 11*a* may be different from the combinations of the symbol waveform and the delay amount, which are allowed to be selected by the relay stations 121 to 124, based on the symbol waveform, or based on the delay amount. In the former case, the transmitting station 11*a* is allowed to select a predetermined symbol waveform, and the relay stations 121 to 124 are allowed to select the symbol waveforms other than the symbol waveform selected by the transmitting station 11*a*. Further, each of the transmitting station 11*a* and the respective relay stations 121 to 124 is allowed to select any delay amount. In this case, although the transmitting station 11*a* may select the delay amount which is the same as one of the amounts of delay selected by the relay stations 121 to 124, it is certain that the transmitting station 11*a* can select a symbol waveform which is different from symbol waveforms selected by the relay stations 121 to 124. Thus, it is possible to securely obtain two branch path diversity effect. On the other hand, in the latter case, the transmitting station 11*a* is allowed to select a predetermined delay amount, and the relay stations 121 to 124 are allowed to select the amounts of delay other than the delay amount selected by the transmitting station 11*a*. Further, each of the transmitting station 11*a* and the relay stations 121 to 124 is allowed to select any symbol waveform. In this case, although the transmitting station 11*a* may select the symbol waveform which is the same as one of the symbol waveforms selected by the relay stations 121 to 124, it is certain that the transmitting station 11*a* selects the delay amount which is different from the amounts of delay selected by the relay stations 121 to 124. Thus, it is possible to securely obtain two branch path diversity effect.

FOURTH EMBODIMENT

Hereinafter, a wireless transmission system 4 according to a fourth embodiment of the present invention will be described. According to the first embodiment, the relay stations 121 to 124 each estimates a combination of a symbol waveform and a delay amount each time a relay packet transmitted by a relay station other than the self relay station is inputted. On the other hand, according to the present embodiment, when each of the relay stations 121 to 124 determines that the transmitting station 11 which transmits a transmission packet thereto is the same as the transmitting station which has previously transmitted a transmission packet thereto, each of the relay stations 121 to 124 uses the combination of the symbol waveform and the delay amount, which has been previously selected for the same transmitting station, without performing the estimation.

Figure 14:
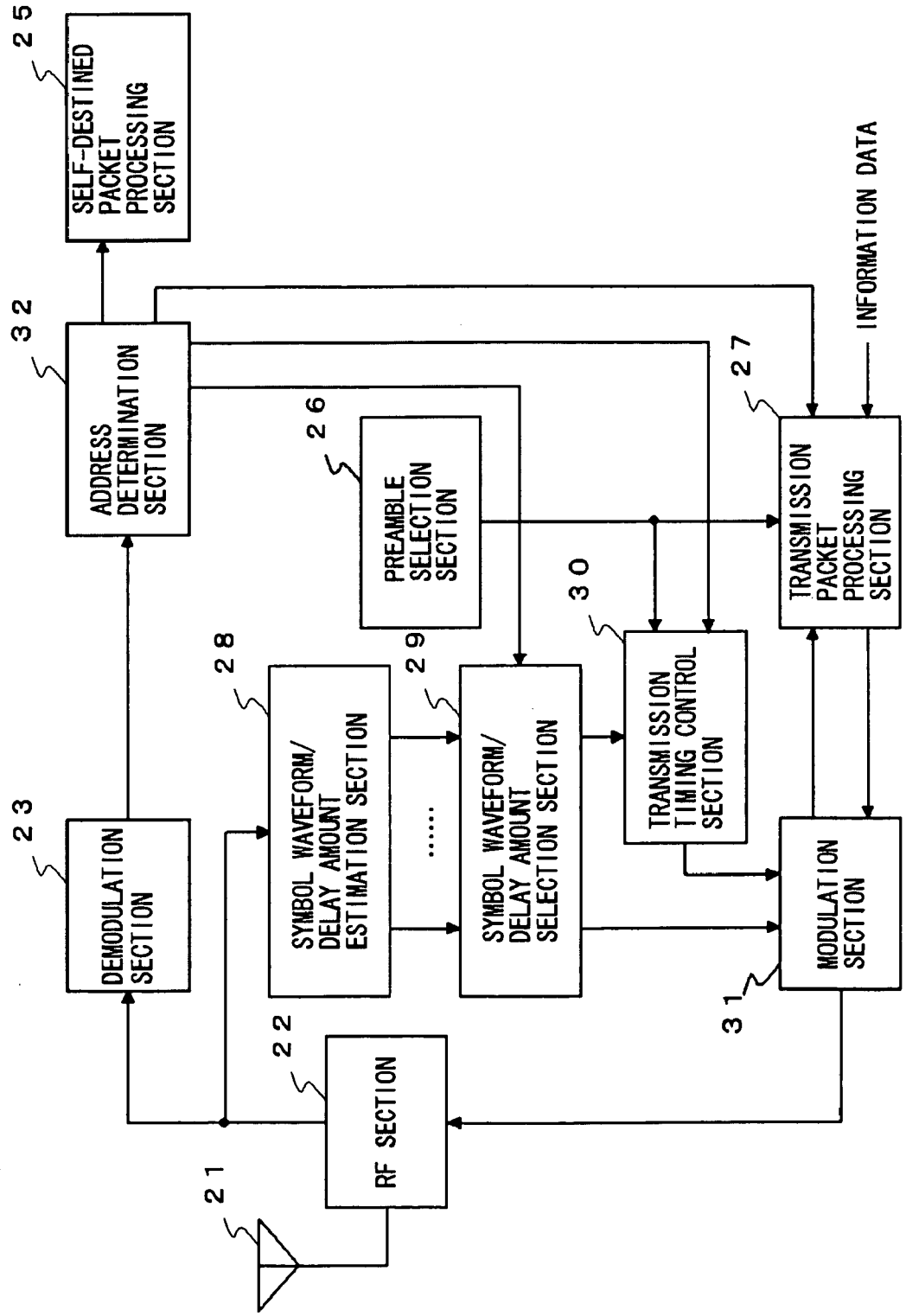
FIG. 14 is a diagram illustrating a configuration of a wireless station according to a fourth embodiment.

FIG. 14 is a diagram illustrating a configuration of a wireless station according to the fourth embodiment. The configuration of the wireless station shown in FIG. 14 is the same as the configuration of the wireless station shown in FIG. 3 except that in FIG. 14 an address determination section 32 is used instead of the self-destined packet determination section 24. The other components are the same as shown in FIG. 3, and therefore the same components are denoted by the same reference numerals as used in FIG. 3, and the description thereof is not given. The symbol waveform/delay amount selection section 29 and the preamble selection section 26 shown in FIG. 14 perform processes which are different from those of the wireless station shown in FIG. 3.

The address determination section 32 performs not only the process to be performed by the self-destined packet determination section 24 shown in FIG. 1, but also detects a transmitter address from the transmission packet being received.

The address determination section 32 outputs the detected transmitter address to the symbol waveform/delay amount selection section 29. The symbol waveform/delay amount selection section 29 further stores association information in which a transmitter address representing the transmitting station 11 from which a transmission packet has been previously received, is associated with the combination of the symbol waveform and the delay amount, which has been selected for the transmission packet which has been previously received. The symbol waveform/delay amount selection section 29 determines, by using the association information, whether or not the transmitter address detected by the address determination section 32 represents the transmitting station 11 from which a transmission packet has been previously received. When the detected transmitter address represents the transmitting station 11 from which the transmission packet has been previously received, the symbol waveform/delay amount selection section 29 selects, by using the association information, the combination of the symbol waveform and the delay amount, which is associated with the detected transmitter address. The association information may include at least one association of a transmitter address representing the transmitting station 11 from which a transmission packet has been previously received, with a combination of a symbol waveform and a delay amount, which has been previously selected for the transmission packet having been previously received. Further, the symbol waveform/delay amount selection section 29 may update the association information each time a transmission packet is received. Further, the symbol waveform/delay amount selection section 29 according to the fourth embodiment is different from the symbol waveform/delay amount selection section 29 according to the first embodiment in that the symbol waveform/delay amount selection section 29 of the fourth embodiment further stores the association information and further performs process based on the association information.

Figure 15:
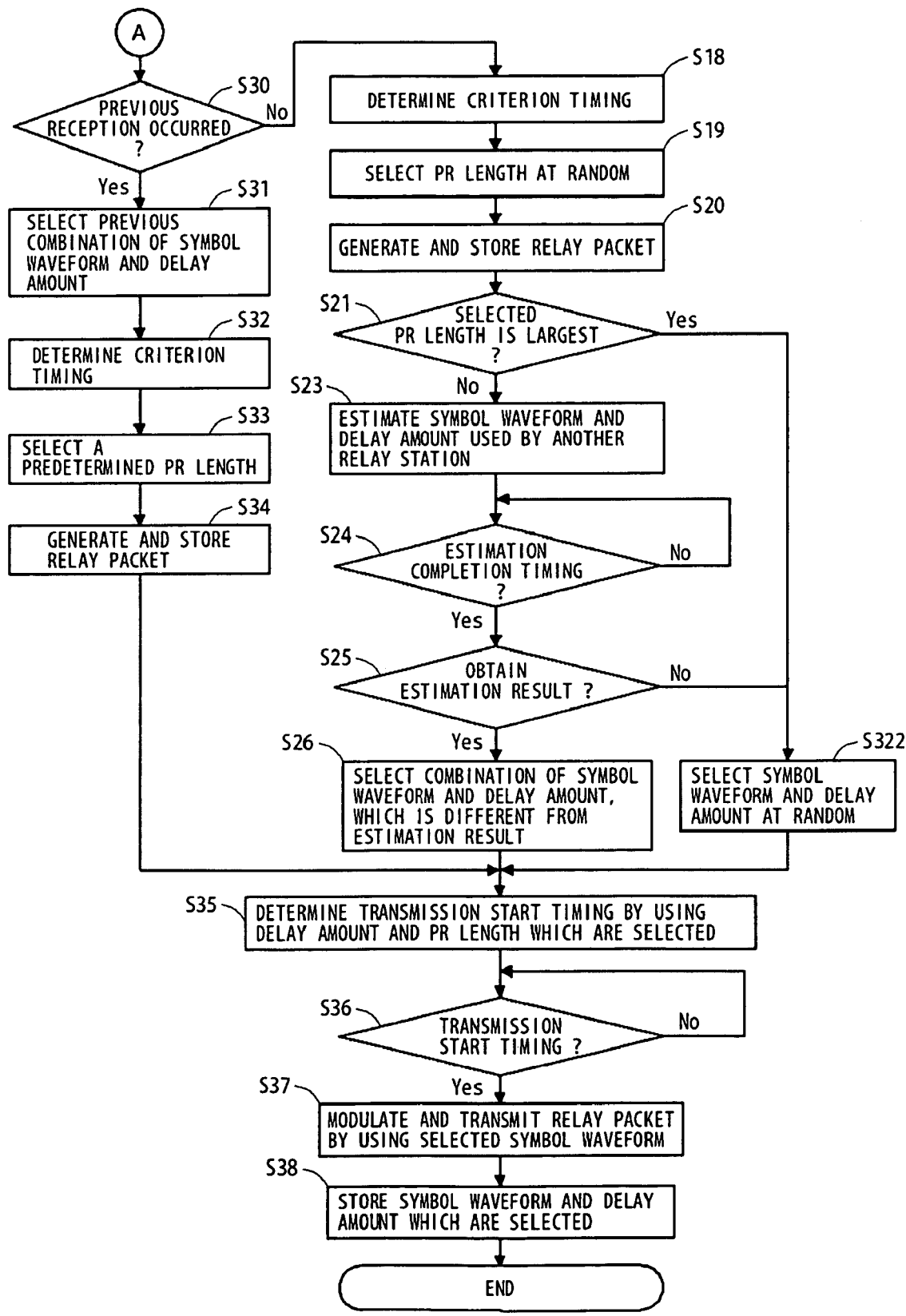
FIG. 15 is a flow chart illustrating an operation performed by a wireless station according to a fourth embodiment.

Next, an operation performed by the wireless station according to the fourth embodiment will be described with reference to FIG. 15. FIG. 15 is a flow chart illustrating an operation performed by the wireless station according to the fourth embodiment. A shown in FIG. 15 follows A shown in FIG. 7. Process steps preceding A shown in FIG. 15 are the same as the process steps shown in FIG. 7. When a reception packet is determined, in FIG. 7, as being a non-self-destined packet (No. in step S16), the process advances through A to step S30 of FIG. 15. In FIG. 15, the symbol waveform/delay amount selection section 29 determines, by using the association information, whether or not the transmitter address detected by the address determination section 32 represents the transmitting station 11 from which a transmission packet has been previously received (step S30). When the detected transmitter address represents the transmitting station 11 which has transmitted the transmission packet having been previously relayed (Yes in step S30), the symbol waveform/delay amount selection section 29 selects, by using the association information, the combination of the symbol waveform and the delay amount, which is associated with the detected transmitter address (step S31). Following step S31, the transmission timing control section 30 determines the criterion timing based on the reception completion signal outputted by the address determination section 32 (step S32). Following step S32, the preamble selection section 26 selects a predetermined PR length (step S33). Following step S33, the transmission packet processing section 27 replaces a preamble included in the transmission packet which is a non-self-destined packet, with a preamble having the PR length selected in step S33 so as to generate a relay packet, and stores the generated relay packet (step S34).

On the other hand, when the detected transmitter address does not represent the transmitting station 11 from which the transmission packet has been previously received (No in step S30), the process advances to step S18. Steps S18 to S26 are the same as steps S18 to S26 shown in FIG. 8, and therefore the description thereof is not given. Following step S34, the transmission timing control section 30 determines the transmission start timing by using the criterion timing, the PR length selected in step S33, the delay amount selected in step S31, S22, or S26, and the PR length which is shortest of a plurality of the PR lengths which are allowed to be selected by the preamble selection section 26 (step S35). Following step S35, the transmission timing control section 30 determines whether or not the transmission start timing has come (step S36). When in step S36 the transmission start timing is determined as having come, the modulation section 31 reads, from the transmission packet processing section 27, the relay packet stored in step S20 or S34, and modulates the read relay packet by using the symbol waveform selected in step S31, S22, or S26, so as to output a modulated baseband signal. The modulated baseband signal is frequency-converted to an RF band signal by the RF section 22, and thereafter transmitted from the antenna 21 (step S37). Following step S37, the symbol waveform/delay amount selection section 29 stores the symbol waveform and the delay amount selected in step S26 (step S38).

Any length may be selected as the predetermined PR length in step S33. For example, when the predetermined PR length is the preamble length which is shortest of the preamble lengths shown in FIG. 2, a relay time from the transmitting station 11 to the receiving station 13 may be reduced as compared to a case where a combination of the symbol waveform and the delay amount is estimated.

Figure 16:
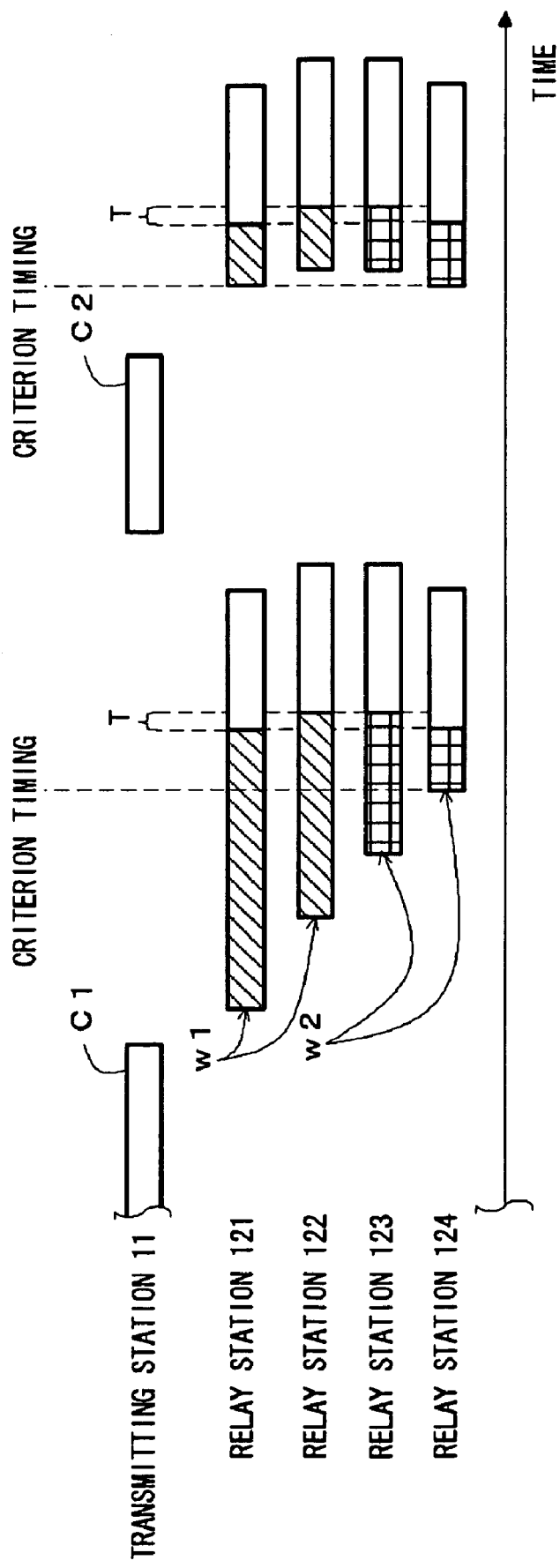
FIG. 16 is a diagram illustrating an outline of process performed by a transmitting station 11 and the relay stations 121 to 124 according to the fourth embodiment.

Next, an exemplary process performed by the transmitting station 11 and the relay stations 121 to 124 according to the fourth embodiment will be described with reference to FIG. 16. FIG. 16 is a diagram illustrating an outline of process performed by the transmitting station 11 and the relay stations 121 to 124 according to the fourth embodiment. In FIG. 16, the transmission packet C1 is a transmission packet transmitted by the transmitting station 11 for the first time. The transmission packet C2 is a transmission packet transmitted by the transmitting station 11 for the second time. The process performed when the transmission packet C1 is transmitted is the same as described with reference to FIG. 9, the description thereof is not given. When the transmission packet C2 for the second time is transmitted by the transmitting station 11, there lay stations 121 to 124 each recognizes that a transmission packet is transmitted from the transmitting station 11 from which a transmission packet has been previously received. The relay stations 121 to 124 each transmits a relay packet in accordance with a previously selected combination, without estimating a combination of a symbol waveform and a delay amount. In FIG. 16, the relay station 121 selects the symbol waveform w1 and the amount 0 of delay, the relay station 122 selects the symbol waveform w1 and the amount T of delay, the relay station 123 selects the symbol waveform w2 and the amount T of delay, and the relay station 124 selects the symbol waveform w2 and the amount 0 of delay. Further, the relay stations 121 to 124 each selects the PR length which is shortest of all the PR lengths which are allowed to be selected.

As described above, according to the present embodiment, the symbol waveform/delay amount selection section 29 stores the association information in which the transmitter address representing the transmitting station 11 from which a transmission packet has been previously received is associated with a combination of a symbol waveform and a delay amount, which has been selected for the transmission packet having been previously received. Thus, when each of the relay stations 121 to 124 determines that the transmitting station 11 which transmits a transmission packet thereto is the same as the transmitting station which has previously transmitted a transmission packet thereto, the combination of the symbol waveform and the delay amount, which has been previously selected for the transmitting station having previously transmitted the transmission packet, is used without performing the estimation.

Although an exemplary case where two types of symbol waveforms (the symbol waveforms w1, w2) and two amounts of delay (the amount 0, T of delay) are used as the transmission parameter is described for each embodiment, the present invention is not limited thereto. For example, three or more types of symbol waveforms, and three or more amounts of delay may be used as the transmission parameter. In general, when k types of symbol waveforms and m amounts of delay are used as the transmission parameter, the maximum number of effective branches is (k×m) A plurality of types of the symbol waveforms and one delay amount may be used as the transmission parameter for obtaining the path diversity effect. In this case, a plurality of types of symbol waveforms only are used as the transmission parameter for obtaining the path diversity effect. One type of symbol waveform and a plurality of amounts of delay may be used as the transmission parameter for obtaining the path diversity effect. In this case, a plurality of amounts of delay only are used as the transmission parameter for obtaining the path diversity effect. When a plurality of types of symbol waveforms are used as the transmission parameter for obtaining the path diversity effect, the plurality of symbol waveforms to be used may not be closely correlated with each other. Further, when a plurality of amounts of delay are used, the plurality of amounts of delay may be set such that differences among the plurality of amounts of delay are greater than or equal to the delay resolution, and a difference between the maximum delay amount and the minimum delay amount is smaller than or equal to the delay upper limit.

Although in each embodiment an exemplary case where the system (E) described above is applied is described, another system may be used. When another system is applied, the modulation section 31 and the demodulation section 23 matching the applied system may be used. Therefore, it is possible to use, as they are, the components of the wireless station shown in FIG. 3, other than the modulation section 31 and the demodulation section 23. For example, the system (E) describe above is a system which utilizes the principle of the DSSS scheme which is one type of the spread spectrum scheme represented as (A) described above. Therefore, the FHSS scheme and the THSS scheme, which are also one type of the spread spectrum scheme, may be applied by changing the spreading method and the de-spreading method of the DSSS scheme.

Further, it is possible to apply the system (B) described above when only the delay amount is used as the transmission parameter. When the OFDM scheme is used, differences among the respective amounts of delay may be greater than or equal to an inverse of a frequency bandwidth including a plurality of subcarriers, and a difference between the maximum delay amount and the minimum delay amount may be smaller than the guard interval length. Further, it is also possible to apply the system (C) described above. When the PSK-VP scheme or the PSK-RZ scheme is used, the delay amount which is allowed to be selected by a relay station may be set such that differences among the respective amounts of delay may represent a fraction of the symbol length corresponding to the delay resolution, and a difference between the maximum delay amount and the minimum delay amount may be smaller than one symbol length. Further, when the DSK scheme is used, differences among the respective amounts of delay may represent a fraction of the symbol length corresponding to the delay resolution, and a difference between the maximum delay amount and the minimum delay amount may be smaller than half the symbol length. It is also possible to apply the system (D) described above. When an equalizer is used, differences among the respective amounts of delay may be greater than or equal to one symbol length, and a difference between the maximum delay amount and the minimum delay amount may be smaller than or equal to a delay upper limit based on the number of taps.

Figure 17:
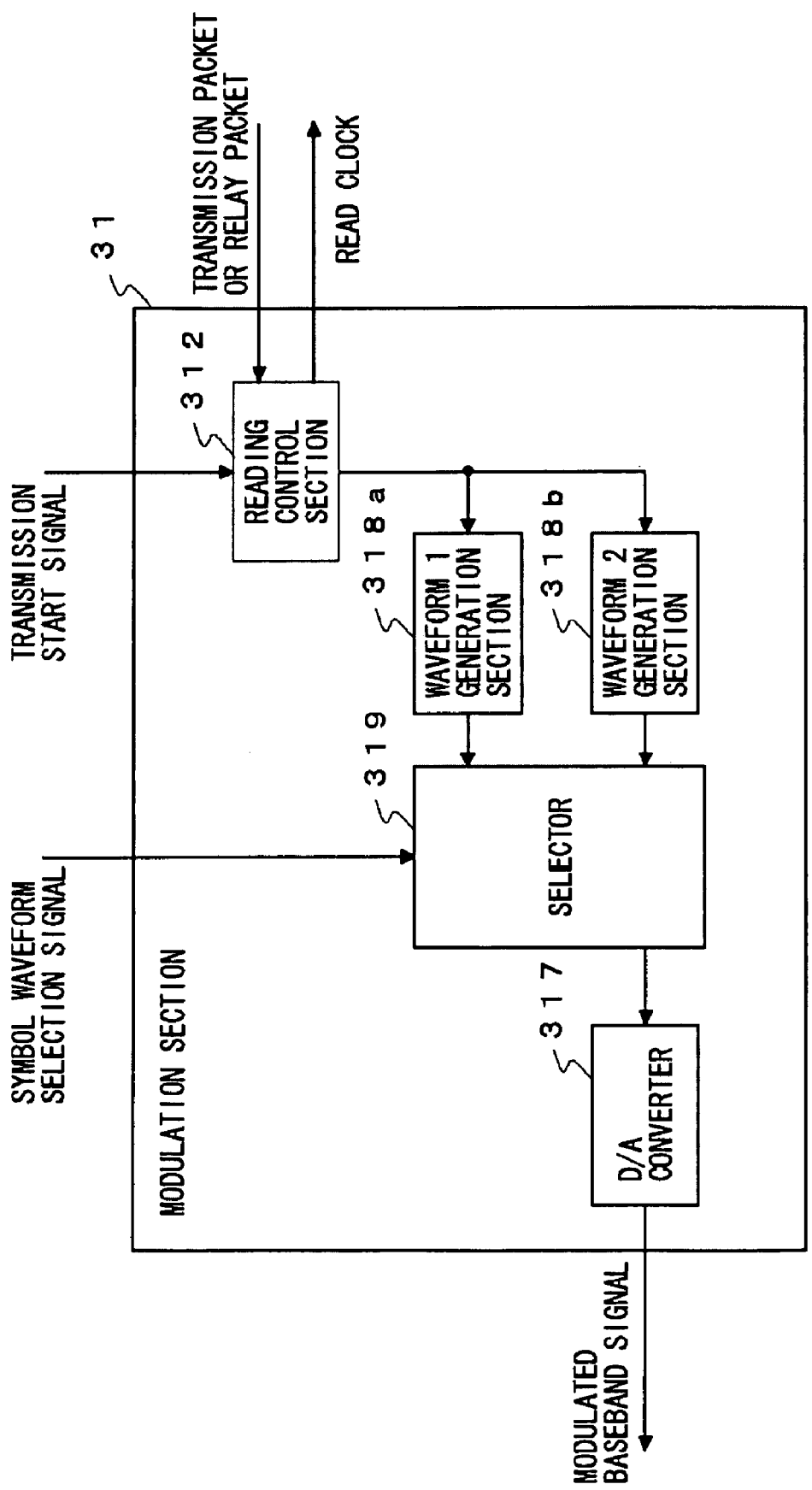
FIG. 17 is a diagram illustrating a configuration of the modulation section 31 used when a system (F) is applied.
Figure 20:
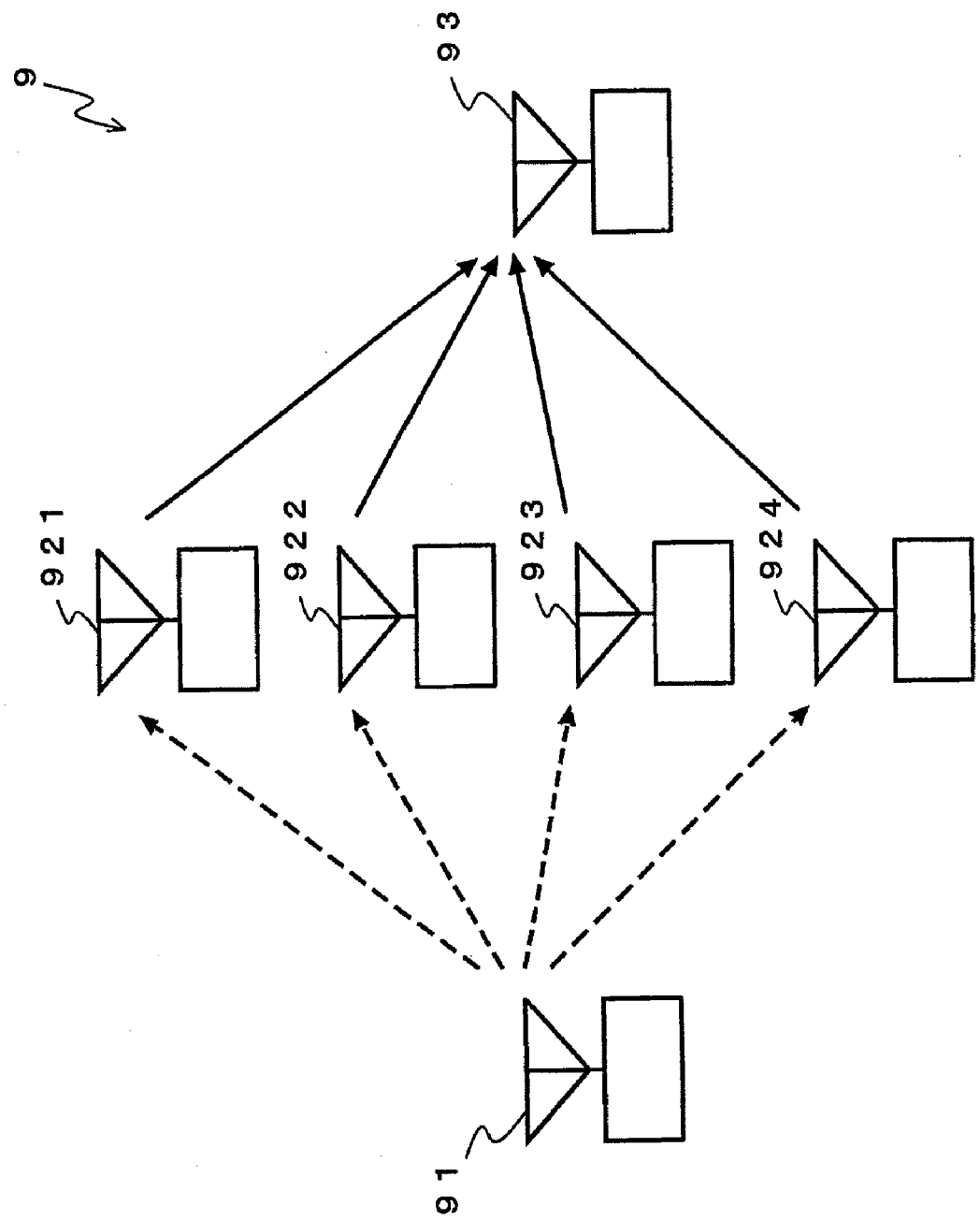
FIG. 20 is a diagram illustrating a configuration of a conventional wireless transmission system 9.

It is also possible to apply the system (F) described above. FIG. 17 shows a configuration of the modulation section 31 used when the system (F) is applied. FIG. 17 is a block diagram illustrating in detail a configuration of the modulation section 31 used when the system (F) is applied. In FIG. 17, the modulation section 31 includes: a reading control section 312; a waveform 1 generation section 318a; a waveform 2 generation section 318b; a selector 319; and a D/A converter 317. The number of waveform generation sections is equal to the number of types of symbol waveforms used for the wireless transmission system.

The reading control section 312 is a counter operating based on a base clock. The reading control section 312 generates, when the transmission start signal is received, a data read clock for reading a transmission packet or a relay packet, based on a counted value. The reading control section 312 transmits the generated data read clock to the transmission packet processing section 27. The transmission packet processing section 27 reads a transmission packet or a relay packet based on the received data read clock, and transmits the transmission packet or the relay packet to the reading control section 312 of the modulation section 31. The reading control section 312 performs, when the transmission packet or the relay packet is received from the transmission packet processing section 27, differential encoding for the transmission packet or the relay packet. The reading control section 312 generates an address signal representing an address used when the waveform generation section reads data. The address signal is outputted to the waveform 1 generation section 318a and the waveform 2 generation section 318b.

The waveform 1 generation section 318a and the waveform 2 generation section 318b each reads, from a waveform memory, data of the symbol waveform based on the transmission packet or the relay packet, in accordance with the inputted address signal. Thus, the waveform 1 generation section 318a and the waveform 2 generation section 318b each generates a modulated baseband signal by phase-modulating data having been subjected to the differential encoding. The waveform memories of the waveform 1 generation section 318a and the waveform 2 generation section 318b previously store the data of the symbol waveforms, respectively, which are different from each other. The data of the symbol waveforms stored in the waveform 1 generation section 318a and the waveform 2 generation section 318b, respectively, will be described below in detail. The selector 319 selects one of signals outputted from the waveform 1 generation section 318a and the waveform 2 generation section 318b, respectively, based on the symbol waveform selection signal outputted by the symbol waveform/delay amount selection section 29, and outputs the selected one to the D/A converter 317.

The D/A converter 317 converts, to an analog signal, the signal outputted by the selector 319, so as to output a modulated baseband signal.

FIG. 18 is a diagram schematically illustrating exemplary phase shifts of the symbol waveforms stored in the waveform 1 generation section 318*a* and the waveform 2 generation section 318*b*. For example, the phase shift of the symbol waveform w1 which is stored as a symbol by the waveform 1 generation section 318*a* is as indicated by the solid line in FIG. 18. In one symbol length T, the phase of the symbol waveform w1 is shifted so as to increase over the passage of time. Further, an amount of temporal change of the phase of the symbol waveform w1 represents a non-negative value, and an absolute value of the amount of the temporal change of the phase tends to reduce in the former part of the symbol waveform, and tends to increase in the latter part thereof. Further, for example, the phase shift of the symbol waveform w2 which is stored as a symbol by the waveform 2 generation section 318*b* is as indicated by dotted line shown in FIG. 18. In one symbol length T, the phase of the symbol waveform w2 is shifted so as to reduce over the passage of time. Further, an amount of temporal change of the phase represents a non-positive value, and an absolute value of the amount of temporal change of the phase tends to reduce in the former part of the symbol waveform, and tends to increase in the latter part thereof. The symbol waveforms stored by the waveform 1 generation section 318*a* and the waveform 2 generation section 318*b*, respectively, are not limited to the aforementioned two waveforms, and may be symbol waveforms, respectively, which are not closely correlated with each other. Further, the waveform 1 generation section 318*a* and the waveform 2 generation section 318*b* may store and use three or more symbol waveforms which are not closely correlated with each other.

As describe above, the modulation section 31 shown in FIG. 17 receives the transmission start signal, and thereafter generates an address signal for reading the symbol waveform from the waveform memory. Thus, a timing at which a modulated baseband signal is to be outputted is changed on a base clock basis in accordance with a timing at which the transmission start signal is received. Further, in general, a frequency which is about several to ten-odd times a symbol frequency (an inverse of a symbol length) is often used as the base clock. Therefore, it is possible to adjust a timing at which the modulated baseband signal is outputted, in increments of about one-nineteenth to about half the symbol length. Further, the modulation section 31 shown in FIG. 17 includes a plurality of waveform generation sections (the waveform 1 generation section 318*a*, the waveform 2 generation section 318*b*), so as to generate a modulated baseband signal through modulation using a desired symbol waveform based on the symbol waveform selection signal.

FIG. 19 is a block diagram illustrating a configuration of the demodulation section 23 used when the path diversity system of (F) described above is used. The demodulation section 23 shown in FIG. 19 includes a differential detection section 237, a post detection filter 238, and data determination section 239. The differential detection section 237 subjects the received baseband signal to differential detection. The post detection filter 238 combines the signals having been subjected to the differential detection so as to output a detection signal. The data determination section 239 determines the wave-detected signal so as to output demodulated data. When signals obtained through modulations using phase redundant waveforms, respectively, different from each other are transmitted from a plurality of the transmitting stations, respectively, the demodulation section 23 shown in FIG. 19 performs demodulation, and therefore the accurate demodulation is enabled for the following reason. A signal in which a plurality of phase redundant waveforms different from each other are superimposed on each other is inputted to the receiving station. At this time, a signal in which the similar superimposing occurs is obtained in an adjacent symbol, and a phase relationship between the symbols adjacent to each other is maintained. Thus, when this signal is subjected to the differential detection, it is possible to detect a phase difference between the symbols adjacent to each other. Although the signal having been subjected to the differential detection varies in a symbol due to the phase redundant waveforms different from each other being superimposed on each other, a sign is not reversed. Therefore, the post detection filter 238 combines the signals having been subjected to the differential detection so as to remove the variation of signal in the symbol. As a result, the data determination section 239 determines a polarity, thereby enabling the demodulation. As described above, the demodulation section 23 shown in FIG. 19 is used to enable accurate demodulation of a signal in which different phase redundant waveforms are superimposed on each other.

Further, in fading environment, signals obtained through modulations performed, by a plurality of transmitting stations, using the phase redundant waveforms different from each other, are influenced by fadings, respectively, different from each other, and received. When the signals are superimposed on each other in phase, the signals enhance each other. When the signals are superimposed on each other in opposite phase, the signals attenuate each other, and therefore each of waveforms of the signals is quite different from an original phase redundant waveform. However, since waveforms having phase redundancies, respectively, different from each other are superimposed on each other, the signals are not in phase opposite to each other in entire one symbol, thereby preventing the signals from attenuating each other in the entire one symbol. That is, one symbol always includes a period in which signals are in phase with each other or a period in which signals are almost in phase with each other. Thus, accurate demodulation is enabled by performing the differential detection, thereby obtaining the path diversity effect.

Although in each embodiment described above the criterion timing is determined based on the reception completion signal indicating that the reception of a packet is completed, a method for determining the criterion timing is not limited thereto. The criterion timing may be determined based on, for example, a timing at which the unique word is detected in a packet. Further, when a beacon station for synchronizing the wireless stations is used, the criterion timing may be determined based on a beacon transmitted from the beacon station. Further, the criterion timing may be determined based on time information included in a GPS (Global Positioning System) signal, or time information obtained from a radio wave clock.

In each embodiment described above, the transmission start timing is determined by the transmission timing control section 30. The transmission timing control section 30 determines the transmission start timing based on the criterion timing, the selected PR length, and the selected delay amount. By determining the transmission start timing, it is possible to set a desired timing as a timing at which each wireless station transmits a packet. However, a method for setting a timing at which each wireless station transmits a packet is not limited thereto. In an alternative method, for example, the modulation section 31 outputs a modulated baseband signal so as to be delayed, thereby enabling a timing at which each wireless station transmits a packet to be set.

Respective functional blocks of the wireless station according to each embodiment may be typically realized as an LSI, which is an integrated circuit. Each of these functional blocks may be separately constructed in a chip form, or may be constructed in a chip form so as to include a part or all of the functional blocks. The LSI may be referred to as an IC, a system LSI, a super LSI, or an ultra LSI, depending on the degree of integration. Also, the method of integration is not limited to LSI, and may be realized by a dedicated circuit or a general purpose processor. An FPGA (Field Programmable Gate Array), which can be programmed after manufacturing LSI, or a reconfigurable processor enabling connections and settings of the circuit cells in the LSI to be reconfigured may be used. Further, in the case where another integration technology (application to biotechnology and the like) replacing LSI becomes available due to improvement of a semiconductor technology or due to the emergence of another technology derived therefrom, integration of the functional blocks may be performed using such a technology.

INDUSTRIAL APPLICABILITY

The present invention is a wireless station for use in a wireless transmission system, and useful as a wireless station enabling the path diversity effect to be obtained regardless of a setting state thereof, a wireless transmission method for the wireless station, a wireless transmission system using the wireless station, and the like.

The invention claimed is:

1. A wireless station used as one of a plurality of relay stations forming transmission paths, respectively, different from each other, in a wireless transmission system for transmitting a packet from a transmitting station to a receiving station through the plurality of relay stations, the wireless station comprising:
 a reception section for receiving a packet transmitted from the transmitting station, and for receiving a packet which is transmitted, based on the packet transmitted from the transmitting station, from another of the plurality of relay stations, and is transmitted before the wireless station performs transmission, by using a transmission parameter for obtaining a path diversity effect in the wireless transmission system;
 a transmission parameter estimation section for estimating the transmission parameter used by the another relay station, based on the packet received by the reception section from the another relay station;
 a transmission parameter selection section for selecting a transmission parameter other than the transmission parameter used by the another relay station, the transmission parameter used by the another relay station being estimated by the transmission parameter estimation section; and
 a transmission section for transmitting, to the receiving station, the packet received by the reception section from the transmitting station, by using the transmission parameter selected by the transmission parameter selection section,
 wherein the transmission parameter selected by the transmission parameter selection section represents at least one of a delay amount for delaying a timing at which the packet transmitted from the transmission section is to be received by the receiving station, and a symbol waveform used by the transmission section for modulating the packet received from the transmitting station.

2. The wireless station according to claim 1,
 wherein the transmission parameter selection section has previously stored therein a plurality of transmission parameters that are different from each other, and
 wherein the transmission parameter selection section selects the transmission parameter other than the transmission parameter which is used by the another relay station and is estimated by the transmission parameter estimation section, from among the plurality of transmission parameters previously stored therein.

3. The wireless station according to claim 1,
 wherein the reception section receives packets transmitted from a plurality of the relay stations other than the wireless station,
 wherein the transmission parameter estimation section estimates a plurality of transmission parameters used by the plurality of relay stations, respectively, other than the wireless station, based on the packets transmitted from the plurality of relay stations, respectively, other than the wireless station,
 wherein the transmission parameter selection section has previously stored therein a plurality of transmission parameters that are different from each other,
 wherein the transmission parameter selection section stops, when each of the plurality of transmission parameters previously stored therein corresponds to any of the plurality of transmission parameters estimated by the transmission parameter estimation section, a process of selecting the transmission parameter, and
 wherein the transmission section performs no transmission to the receiving station when the transmission parameter selection section stops the process of selecting the transmission parameter.

4. The wireless station according to claim 1,
 wherein a head portion of the packet includes a preamble,
 wherein the wireless station further
 comprises a preamble selection section, having previously stored therein a plurality of types of preamble length information representing lengths, respectively, of a preamble, the lengths being different from each other, for selecting one of the plurality of types of preamble length information at random,
 wherein the transmission section transmits the packet received from the transmitting station, at a timing based on a length represented by the one of the plurality of types of preamble length information, which is selected by the preamble selection section.

5. The wireless station according to claim 4, wherein the lengths represented by the plurality of types of preamble length information, respectively, are each a length within a predetermined range.

6. The wireless station according to claim 4, wherein a number of the types of preamble length information is equal to or greater than a number of types of the transmission parameter.

7. The wireless station according to claim 1,
 wherein a head portion of the packet includes a preamble,
 wherein the wireless station further
 comprises a preamble selection section, having previously stored therein a plurality of data sequences of a preamble, the plurality of data sequences being different from each other, for selecting one of the plurality of data sequences,
 wherein the transmission section replaces the preamble included in the packet received from the transmitting station, with a preamble having the one of the plurality of data sequences, which is selected by the preamble selection section, and transmits, to the receiving station, the packet which is received from the transmitting station and has the preamble replaced, by using the transmission parameter selected by the transmission parameter selection section.

8. The wireless station according to claim 1, wherein the transmission parameter estimation section estimates the transmission parameter used by the another relay station, by obtaining a correlation between a predetermined waveform and a waveform represented by the packet received by the reception section from the another relay station.

9. The wireless station according to claim 8,
wherein the transmission parameter represents the symbol waveform used by the transmission section for modulating the packet received from the transmitting station, and
wherein the transmission parameter estimation section generates a correlation signal representing a result of the correlation between the predetermined waveform and the waveform represented by the packet received by the reception section from the another relay station, and estimates, when the correlation signal represents a peak having a value greater than or equal to a predetermined threshold value, that a symbol waveform used by the another relay station is based on the predetermined waveform.

10. The wireless station according to claim 8,
wherein the transmission parameter represents the delay amount for delaying the timing at which the packet transmitted from the transmission section is to be received by the receiving station, and
wherein the transmission parameter estimation section generates a correlation signal representing a result of the correlation between the predetermined waveform and the waveform represented by the packet received by the reception section from the another relay station, and estimates a delay amount used by the another relay station, based on a timing at which a peak having a value greater than or equal to a predetermined threshold value appears in the correlation signal.

11. The wireless station according to claim 8,
wherein the transmission parameter represents the delay amount for delaying the timing at which the packet transmitted from the transmission section is to be received by the receiving station, and the symbol waveform used by the transmission section for modulating the packet received from the transmitting station, and
wherein the transmission parameter estimation section generates a correlation signal representing a result of the correlation between the predetermined waveform and the waveform represented by the packet received by the reception section from the another relay station, and estimates, when the correlation signal represents a peak having a value greater than or equal to a predetermined threshold value, that a symbol waveform used by the another relay station is based on the predetermined waveform, and estimates a delay amount used by the another relay station, based on a timing at which the peak appears.

12. A wireless transmission system for transmitting a packet from a transmitting station to a receiving station through a plurality of relay stations forming transmission paths, respectively, different from each other, the wireless transmission system comprising:

the transmitting station for transmitting the packet;
the plurality of relay stations, forming the transmission paths, respectively, different from each other, for relaying, to the receiving station, the packet received from the transmitting station; and
the receiving station for receiving the packet transmitted from each of the plurality of relay stations,
wherein each of the plurality of relay stations includes:
a primary reception section for receiving the packet transmitted from the transmitting station, and for receiving a packet which is transmitted, based on the packet transmitted from the transmitting station, from another relay station, and is transmitted before the relay station itself performs transmission, by using a transmission parameter for obtaining a path diversity effect in the wireless transmission system;
a primary transmission parameter estimation section for estimating the transmission parameter used by the another relay station, based on the packet received by the primary reception section from the another relay station;
a primary transmission parameter selection section for selecting a transmission parameter other than the transmission parameter used by the another relay station, the transmission parameter used by the another relay station being estimated by the primary transmission parameter estimation section; and
a primary transmission section for transmitting, to the receiving station, the packet received by the primary reception section from the transmitting station, by using the transmission parameter selected by the primary transmission parameter selection section,
wherein the transmission parameter selected by the primary transmission parameter selection section represents at least one of a delay amount for delaying a timing at which the packet transmitted from the primary transmission section is to be received by the receiving station, and a symbol waveform used by the primary transmission section for modulating the packet received from the transmitting station.

13. The wireless transmission system according to claim 12,
wherein the transmitting station includes:
a secondary reception section for receiving the packet which is transmitted, based on the packet transmitted from the transmitting station, from at least one of the plurality of relay stations, and is transmitted before the transmitting station performs transmission, by using the transmission parameter;
a secondary transmission parameter estimation section for estimating the transmission parameter used by the at least one relay station, based on the packet received from the at least one relay station by the secondary reception section;
a secondary transmission parameter selection section for selecting the transmission parameter other than the transmission parameter which is used by the at least one relay station and is estimated by the secondary transmission parameter estimation section; and
a secondary transmission section for transmitting, to the receiving station, a packet to be transmitted from the transmitting station, by using the transmission parameter selected by the secondary transmission parameter selection section.

14. The wireless transmission system according to claim 13,
- wherein the primary transmission parameter selection section has a plurality of transmission parameters that are different from each other previously stored therein,
- wherein the primary transmission parameter selection section selects the transmission parameter other than the transmission parameter which is used by the another relay station, and is estimated by the primary transmission parameter estimation section, from among the plurality of transmission parameters previously stored therein,
- wherein the secondary transmission parameter selection section has previously stored therein a plurality of transmission parameters, different from each other, other than the plurality of transmission parameters previously stored in the primary transmission parameter selection section, and
- wherein the secondary transmission parameter selection section selects the transmission parameter other than the transmission parameter used by the at least one relay station and is estimated by the secondary transmission parameter estimation section, from among the plurality of the transmission parameter previously stored therein.

15. The wireless transmission system according to claim 12,
- wherein the primary transmission parameter selection section has a plurality of transmission parameters that are different from each other previously stored therein,
- wherein the primary transmission parameter selection section selects the transmission parameter other than the transmission parameter used by the another relay station, and is estimated by the primary transmission parameter estimation section, from among the plurality of transmission parameters previously stored therein,
- wherein the transmitting station has previously stored therein a predetermined transmission parameter other than the plurality of transmission parameters previously stored in the primary transmission parameter selection section, and
- wherein the transmitting station transmits the packet to be used by the plurality of relay stations, and thereafter further transmits, to the receiving station, the packet to be transmitted from the transmitting station, by using the predetermined transmission parameter previously stored therein.

16. A wireless transmission method performed by a wireless station used as one of a plurality of relay stations forming transmission paths, respectively, different from each other, in a wireless transmission system for transmitting a packet from a transmitting station to a receiving station through the plurality of relay stations, the wireless transmission method comprising:
- a reception step of receiving a packet transmitted from the transmitting station, and receiving a packet which is transmitted, based on the packet transmitted from the transmitting station, from another relay station, and is transmitted before the one relay station itself performs transmission, by using a transmission parameter for obtaining a path diversity effect in the wireless transmission system;
- a transmission parameter estimation step of estimating the transmission parameter used by the another relay station, based on the packet received from the another relay station in the reception step;
- a transmission parameter selection step of selecting a transmission parameter other than the transmission parameter used by the another relay station, the transmission parameter used by the another relay station being estimated in the transmission parameter estimation step; and
- a transmission step of transmitting, to the receiving station, the packet received from the transmitting station in the reception step, by using the transmission parameter selected in the transmission parameter selection step,
- wherein the transmission parameter selected in the transmission parameter selection step represents at least one of a delay amount for delaying a timing at which the packet transmitted in the transmission step is to be received by the receiving station, and a symbol waveform used in the transmission step for modulating the packet received from the transmitting station.

* * * * *